US 9,485,727 B2

United States Patent
Ng et al.

(10) Patent No.: US 9,485,727 B2
(45) Date of Patent: Nov. 1, 2016

(54) METHOD AND APPARATUS FOR FAST TCH TO IDLE TRANSITION

(71) Applicant: QUALCOMM Incorporated, San Diego, CA (US)

(72) Inventors: Alvin S. Ng, Hong Kong (CN); Troy R. Curtiss, Erie, CO (US); Stanley Tsai, Erie, CO (US); Joshua T. MacDonald, Erie, CO (US); Chunchung Chan, Hong Kong (CN); Tak Wai Wu, Hong Kong (CN); Ammar T. Kitabi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 97 days.

(21) Appl. No.: 13/856,854

(22) Filed: Apr. 4, 2013

(65) Prior Publication Data

US 2014/0269472 A1    Sep. 18, 2014

Related U.S. Application Data

(60) Provisional application No. 61/799,475, filed on Mar. 15, 2013.

(51) Int. Cl.
*H04W 52/02* (2009.01)
*H04W 4/00* (2009.01)
(Continued)

(52) U.S. Cl.
CPC ......... *H04W 52/0212* (2013.01); *H04W 4/005* (2013.01); *H04W 8/22* (2013.01);
(Continued)

(58) Field of Classification Search
CPC ......... H04W 72/042; H04W 72/0413; H04W 36/0055; H04W 48/16
See application file for complete search history.

(56) References Cited

U.S. PATENT DOCUMENTS 6,330,234 B1   12/2001   Tomasi et al.
6,667,962 B1   12/2003   Lee et al.
(Continued)

FOREIGN PATENT DOCUMENTS

WO    WO-93/18596 A1    9/1993

OTHER PUBLICATIONS

Alcatel-Lucent Shanghai Bell et al., "Discussion on MTC Idle states," 3GPP TSG-WG #69-bis, R2-102033, pp. 1-4, (Apr. 1, 2010).
(Continued)

*Primary Examiner* — Andrew Lai
*Assistant Examiner* — Jamaal Henson
(74) *Attorney, Agent, or Firm* — Arent Fox LLP

(57) ABSTRACT

Techniques for determining if it is safe for a mobile device to transition directly from a traffic session to a paging mode and for avoiding network re-synchronization procedures in stationary M2M devices are disclosed. It may be safe for direct transition if before-call and in-call network parameters correspond. If safe, the mobile device may transition from the traffic session directly to the paging mode to begin immediately monitoring the paging channel. In stationary M2M devices, paging information is stored before the traffic session and, once the traffic session is complete, the M2M device may be configured to receive paging messaging based on the stored paging information. The M2M device may also store system access information and confirm the validity of the information before returning to the sleep state. The stationary M2M device avoids network re-synchronization procedures. Other aspects, embodiments, and features are also claimed and described.

43 Claims, 22 Drawing Sheets

(51) Int. Cl.
*H04W 8/22* (2009.01)
*H04W 68/00* (2009.01)
*H04W 76/04* (2009.01)
*H04W 76/06* (2009.01)

(52) U.S. Cl.
CPC ......... *H04W 68/00* (2013.01); *H04W 76/046* (2013.01); *H04W 76/048* (2013.01); *H04W 76/06* (2013.01); *Y02B 60/50* (2013.01)

(56) References Cited

U.S. PATENT DOCUMENTS

| | | | |
|---|---|---|---|
| 7,180,879 B2 | 2/2007 | Sinnarajah et al. | |
| 7,606,601 B2* | 10/2009 | An et al. | 455/574 |
| 7,969,924 B2* | 6/2011 | Young | H04W 72/02 370/311 |
| 2002/0177461 A1* | 11/2002 | Rosen et al. | 455/518 |
| 2003/0017842 A1 | 1/2003 | Moles et al. | |
| 2005/0054389 A1* | 3/2005 | Lee et al. | 455/574 |
| 2006/0007877 A1 | 1/2006 | Vaittinen et al. | |
| 2006/0148469 A1 | 7/2006 | Kim | |
| 2006/0268768 A1 | 11/2006 | Harris et al. | |
| 2007/0259699 A1 | 11/2007 | Homchaudhuri | |
| 2008/0182594 A1* | 7/2008 | Flore et al. | 455/458 |
| 2009/0312004 A1 | 12/2009 | Farnsworth et al. | |
| 2010/0165970 A1 | 7/2010 | Lee | |
| 2010/0272015 A1 | 10/2010 | Chmiel et al. | |
| 2010/0291939 A1 | 11/2010 | Jen et al. | |
| 2011/0051639 A1* | 3/2011 | Ramakrishnan et al. | 370/311 |
| 2011/0070900 A1* | 3/2011 | Shi | H04W 68/00 455/458 |
| 2012/0208548 A1 | 8/2012 | Park | |
| 2013/0210467 A1 | 8/2013 | Kim et al. | |
| 2013/0252610 A1 | 9/2013 | Kim et al. | |
| 2014/0106749 A1 | 4/2014 | Wegmann et al. | |
| 2014/0120976 A1 | 5/2014 | Shah et al. | |
| 2014/0177613 A1* | 6/2014 | Baker | H04W 84/12 370/338 |
| 2014/0187283 A1 | 7/2014 | Nimbalker et al. | |
| 2014/0256324 A1 | 9/2014 | Mohanty et al. | |
| 2014/0274019 A1 | 9/2014 | Batchu et al. | |
| 2014/0376435 A1 | 12/2014 | Morioka et al. | |
| 2015/0119044 A1 | 4/2015 | Hwang et al. | |
| 2015/0148063 A1 | 5/2015 | Jung et al. | |
| 2015/0237640 A1 | 8/2015 | Uemura et al. | |

OTHER PUBLICATIONS

3GPP, "Technical Specification Group Radio Access Network; Evolved Universal Terrestrial Radio Access (E-UTRA); Radio Resource Control (RRC); Protocol specification (Release 10)," 3GPP TS 36.331; vol. 10.8.0 (Dec. 2012); pp. 1-305 (Jan. 3, 2013).
3GPP, "Technical Specification Group Radio Access Network; Radio Resource Control (RRC); Protocol specification (Release 10)," 3GPP TS 25.331; vol. 10.10.0 (Dec. 2012); pp. 1-124, 398-403, 450-483, 614-728, 1122-1132 (292 total pages) (Jan. 2, 2013).
3GPP, "Technical Specification Group Radio Access Network; Evolved Universal Terrestrial Radio Access (E-UTRA); User Equipment (UE) procedures in idle mode (Release 11)," 3GPP TS 36.304; vol. 11.3.0 (Mar. 2013); pp. 1-34 (Mar. 12, 2013).
3GPP, "Technical Specification Group Radio Access Network; User Equipment (UE) procedures in idle mode and procedures for cell reselection in connected mode (Release 11)," 3GPP TS 25.304; vol. 11.2.0 (Mar. 2013); pp. 1-53 (Mar. 14, 2013).
International Search Report dated Sep. 25, 2014 issued in International Patent Application No. PCT/US2014/024955 (15 total pages).
International Search Report dated Sep. 25, 2014 issued in International Patent Application No. PCT/US2014/024622 (14 total pages).
CATT: "Synchronisation for Triggering Detached MTC Devices", SA WG2 Meeting #85, S2112339, 3GPP, May 11, 2011, 3 Pages, http://www.3gpp.org/ftp/tsg_sa/WG2_Arch/TSGS2_85_XiAN/Docs/S2-112339.zip.

\* cited by examiner

METHOD AND APPARATUS FOR FAST TCH TO IDLE TRANSITION

PRIORITY CLAIM

This application claims priority to and the benefit of U.S. Provisional Application No. 61/799,475, filed 15 Mar. 2013, which is incorporated by reference herein as if fully set forth below and for all applicable purposes.

TECHNICAL FIELD

The technology discussed below relates generally to wireless communication, and more specifically to methods, systems, and devices configured for fast transition from a traffic session to a paging mode and also to avoid network re-synchronization procedures for stationary Machine-to-Machine (M2M) devices.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

One or more communication devices (e.g., a user equipment, M2M device, mobile station, a tablet device, a laptop, etc.) may be operable on the wireless communications system to communicate with one another, or other entities through the wireless communications system. Generally, the communications device registers with a base station of the wireless communications system and then enters into a paging or sleep mode where it monitors a Paging Channel (PCH). When the communications device needs to communicate over the wireless communications system (e.g., to initiate or receive a voice call, transmit or receive data, etc.), the device will transition from the paging mode to an active mode where it enters into a traffic session and communicates via a Traffic Channel (TCH) on the wireless communications system.

When the communications device completes the traffic session, the device will generally transition back to the paging mode where it monitors the PCH. To transition from the traffic session back to the paging mode, the communications device will generally complete a re-synchronization process that involves pilot acquisition and SYNC message decoding. The pilot acquisition and SYNC message decoding process involves receiving and decoding messages from the base station, which takes time for the communications device to complete. During this re-synchronization time, the communications device cannot monitor the PCH and may, for example, miss an incoming paging signal indicating an incoming call for the communications device. Furthermore, the pilot acquisition and SYNC message decoding process utilizes the hardware components on the communication device to receive, decode, store, etc., the re-synchronization messages. Operating the hardware on the communications device reduces power efficiency of the device.

BRIEF SUMMARY OF SOME SAMPLE EMBODIMENTS

The described features generally relate to one or more improved systems, methods, and/or apparatuses for fast transition from a traffic session to a paging mode (may also be referred to as an IDLE mode or a sleep mode). The described techniques may be used by, for example, a mobile device (e.g., a communications device, a user equipment (UE), etc.), to transition, upon terminating a traffic session, directly from a TCH to a paging or sleep mode. The described features permit the communications device to determine if it is safe to transition directly from the TCH to the paging mode. The communications device may determine that it is safe to transition directly from the TCH to the paging mode where it monitors the PCH based on a determination using network parameters stored before initiation of, and during the traffic session. In some embodiments, the communications device may store network parameters while in the paging mode (e.g., before or during initiation of the traffic session) and then store corresponding network parameters while in the traffic session. When the traffic session is terminated, the device may compare the stored network parameters and, if certain of the network parameters substantially correspond, transition directly from the TCH to the paging mode. The before-call and in-call network parameters may be compared using a hierarchical flow. Accordingly, if certain network parameters do not substantially correspond, the communications device may complete the standard pilot acquisition and SYNC decoding process before transitioning back to the paging mode.

In some embodiments, the communications device may have two, independently tunable receivers. A first receiver may be tuned to communicate via the TCH while in the traffic session while a second receiver may be tuned to receive paging information via the PCH while in the traffic session. The communications device may receive current paging information via the second receiver and may safely transition directly from the traffic session to a paging mode when the traffic session terminates.

In accordance with other embodiments, a method of wireless communication performed by a mobile device may be provided. The mobile device may be a user equipment operable to communicate on the wireless communications network. The method may include storing, before initiation of a traffic session with a wireless communications network, a first set of network parameters. The method may also include storing, during the traffic session, a second set of network parameters. The method may further include determining, upon termination of the traffic session, synchronization information for a direct transition from the traffic session to a paging mode based on one or more of the first or second set of network parameters. The determination may include comparing the first and second set of network parameters. The method may even further include transitioning, based on the determination, directly from the traffic session to the paging mode. The transitioning may be completed without performing one or more of pilot acquisition or synchronization signal decoding. The method may include decoding, upon transitioning to the paging mode, paging signaling by blind detection according to a predetermined sequence of paging channel rates.

The first set of network parameters may be received from the wireless communications network over a paging channel before initiation of the traffic session. The first set of network parameters may include a paging channel rate, where the method includes decoding, upon transitioning to the paging mode, paging signaling utilizing the paging channel rate. The second set of network parameters may be received from the wireless communications network over a traffic session during the traffic session. The first and second set of network parameters include one or more of a system identification (SID), a network identification (NID), a band class, a frequency channel, or a pilot sequence. Accordingly, the method may include determining that the first and second set of network parameters substantially correspond based at least in part on the SID and the NID being the same in the first and second set of network parameters. When the band class is one of a plurality of band classes listed in a channel list, the method may include determining that the first and second set of network parameters substantially correspond based at least in part on the band class of the second set of network parameters being one of the plurality of band classes listed in the channel list. When the frequency channel is one of a plurality of frequencies listed in a frequency channel list, the method include determining that the first and second set of network parameters substantially correspond based at least in part on the frequency channel of the second set of network parameters being one of the plurality of frequencies listed in the frequency channel list. Other aspects may provide for the method to include determining that the first and second set of network parameters substantially correspond based at least in part on the SID, the NID, the band class, the frequency channel, and the pilot sequence being the same in the first and second set of network parameters.

Other aspects may provide for the mobile device to include a first and second receiver where the method can include receiving, by the first receiver of the mobile device, data signaling associated with the traffic session. The method may also include receiving, by a second receiver of the mobile device, paging signaling comprising one or more of pilot sequences or synchronization signaling.

In accordance with other embodiments, a wireless communications system is provided. The wireless communications system is configured for fast transition from a traffic session to a paging mode and includes means for storing, before initiation of a traffic session with a wireless communications network, a first set of network parameters. The system can include means for storing, during the traffic session, a second set of network parameters and means for determining, upon termination of the traffic session, synchronization information for a direct transition from the traffic session to a paging mode based on one or more of the first or second set of network parameters. The system also includes means for transitioning, based on the determination, directly from the traffic session to the paging mode. In some aspects, the system includes means for comparing the first set of network parameters to the second set of network parameters upon termination of the traffic session. Transitioning from the traffic session to the paging mode can be without performing one or more of pilot acquisition or synchronization signal decoding.

According to some aspects, the wireless communications system includes means for receiving, by a first receiver of the mobile device, data signaling associated with the traffic session and also means for receiving, by a second receiver of the mobile device, paging signaling comprising one or more of pilot sequences or synchronization signaling. Some aspects may provide for the system to include means for receiving, before initiation of the traffic session, the first set of network parameters from the wireless communications network over a paging channel, and also means for receiving, during the traffic session, the second set of network parameters from the wireless communications network over a traffic channel. The first set of network parameters may include a paging channel rate. In that case, the system further includes means for decoding, upon transitioning to the paging mode, paging signaling utilizing the paging channel rate. The wireless communications system may also include means for decoding, upon transitioning to the paging mode, paging signaling by blind detection according to a predetermined sequence of paging channel rates.

The first and second set of network parameters include one or more of a SID, a NID, a band class, a frequency channel, or a pilot sequence. The means for determining may include means for determining that the first and second set of network parameters substantially correspond based at least in part on the SID and the NID being the same in the first and second set of network parameters. According to other aspects, when the band class is one of a plurality of band classes listed in a channel list, the means for determining may include means for determining that the first and second set of network parameters substantially correspond based at least in part on the band class of the second set of network parameters being one of the plurality of band classes listed in the channel list. When the frequency channel is one of a plurality of frequencies listed in a frequency channel list, the means for determining may include means for determining that the first and second set of network parameters substantially correspond based at least in part on the frequency channel of the second set of network parameters being one of the plurality of frequencies listed in the frequency channel list. According to other aspects, the means for determining can include means for determining that the first and second set of network parameters substantially correspond based at least in part on the SID, the NID, the band class, the frequency channel, and the pilot sequence being the same in the first and second set of network parameters.

According to other embodiments, a computer program product for fast transition from a traffic session to a paging mode in a wireless communications system is provided. The program may include a non-transitory computer readable medium including code for storing, before initiation of a traffic session with a wireless communications network, a first set of network parameters; code for storing, during the traffic session, a second set of network parameters; code for determining, upon termination of the traffic session, synchronization information for a direct transition from the traffic session to a paging mode based on one or more of the first or second set of network parameters; and code for transitioning, based on the determination, directly from the traffic session to the paging mode. The program may also include code for comparing the first set of network parameters to the second set of network parameters upon termination of the traffic session. Other aspects may provide for code for receiving, by a first receiver of the mobile device, data signaling associated with the traffic session, and code for receiving, by a second receiver of the mobile device, paging signaling comprising one or more of pilot sequences or synchronization signaling. The code for transitioning can include code for transitioning from the traffic session to the paging mode without performing one or more of pilot acquisition or synchronization signal decoding.

According to other aspects, the program includes code for receiving, before initiation of the traffic session, the first set of network parameters from the wireless communications network over a paging channel; and code for receiving, during the traffic session, the second set of network parameters from the wireless communications network over a traffic channel. When the first set of network parameters includes a paging channel rate, the program also includes code for decoding, upon transitioning to the paging mode, paging signaling utilizing the paging channel rate. The program can include code for decoding, upon transitioning to the paging mode, paging signaling by blind detection according to a predetermined sequence of paging channel rates.

According to other aspects, the first and second set of network parameters include one or more of a SID, a NID, a band class, a frequency channel, or a pilot sequence. The code for determining may include code for determining that the first and second set of network parameters substantially correspond based at least in part on the SID and the NID being the same in the first and second set of network parameters. When the band class is one of a plurality of band classes listed in a channel list, the program can include code for determining that the first and second set of network parameters substantially correspond based at least in part on the band class of the second set of network parameters being one of the plurality of band classes listed in the channel list. When the frequency channel is one of a plurality of frequencies listed in a frequency channel list, the program can include code for determining that the first and second set of network parameters substantially correspond based at least in part on the frequency channel of the second set of network parameters being one of the plurality of frequencies listed in the frequency channel list. The code for determining can include code for determining that the first and second set of network parameters substantially correspond based at least in part on the SID, the NID, the band class, the frequency channel, and the pilot sequence being the same in the first and second set of network parameters. According to some aspects, the non-transitory computer readable medium is a user equipment operable on a wireless communications network.

According to further embodiments, a wireless communications device configured for fast transition from a traffic session to a paging mode is provided. The wireless communications device can be a user equipment unit operable to communicate on the wireless communications system. The wireless communications device can include at least one controller. The controller can be configured to store, before initiation of a traffic session with a wireless communications network, a first set of network parameters; store, during the traffic session, a second set of network parameters; determine, upon termination of the traffic session, synchronization information for a direct transition from the traffic session to a paging mode based on one or more of the first or second set of network parameters; and transition, based on the determined synchronization information, directly from the traffic session to the paging mode. The device may transition from the traffic session to the paging mode without performing one or more of pilot acquisition or synchronization signal decoding. The controller can also be configured to compare the first set of network parameters to the second set of network parameters upon termination of the traffic session to determine the synchronization information. The device may also include a first receiver configured to receive data signaling associated with the traffic session, and a second receiver configured to receive paging signaling comprising one or more of pilot sequences or synchronization signaling. The controller can be further configured to receive, before initiation of the traffic session, the first set of network parameters from the wireless communications network over a paging channel; and receive, during the traffic session, the second set of network parameters from the wireless communications network over a traffic channel.

According to certain aspects, the first set of network parameters can include a paging channel rate, and the controller can be further configured to decode, upon transitioning to the paging mode, paging signaling utilizing the paging channel rate. The controller can be further configured to decode, upon transitioning to the paging mode, paging signaling by blind detection according to a predetermined sequence of paging channel rates.

According to other aspects, the first and second set of network parameters include one or more of a SID, a NID, a band class, a frequency channel, or a pilot sequence. The controller configured to determine is further configured to determine that the first and second set of network parameters substantially correspond based at least in part on the SID and the NID being the same in the first and second set of network parameters. When the band class is one of a plurality of band classes listed in a channel list, the controller configured to determine is further configured to determine that the first and second set of network parameters substantially correspond based at least in part on the band class of the second set of network parameters being one of the plurality of band classes listed in the channel list. When the frequency channel is one of a plurality of frequencies listed in a frequency channel list, the controller configured to determine is further configured to determine that the first and second set of network parameters substantially correspond based at least in part on the frequency channel of the second set of network parameters being one of the plurality of frequencies listed in the frequency channel list. The controller configured to determine can be further configured to determine that the first and second set of network parameters substantially correspond based at least in part on the SID, the NID, the band class, the frequency channel, and the pilot sequence being the same in the first and second set of network parameters.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
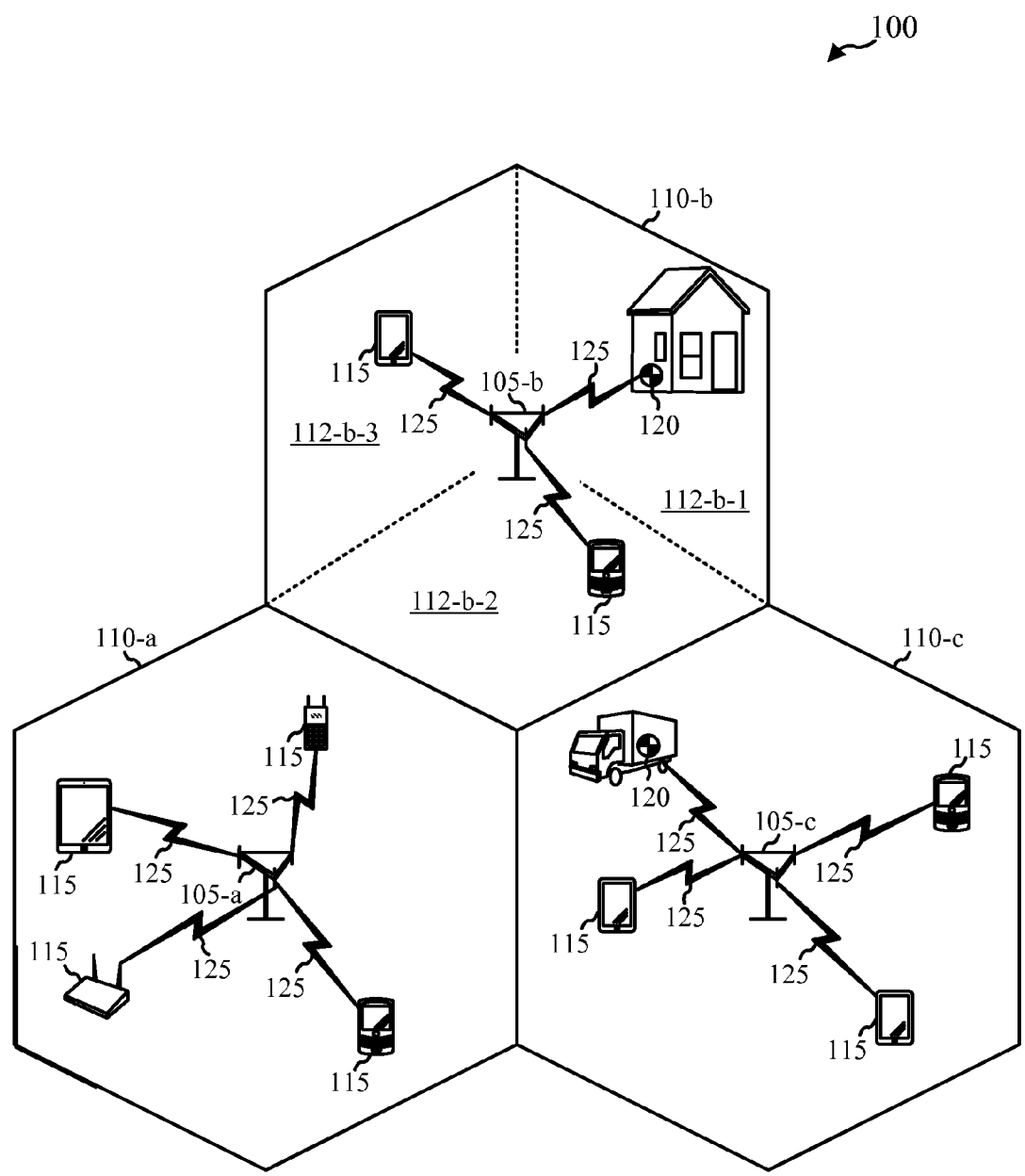
FIG. 1 is a diagram illustrating an example of a wireless communications system.
Figure 1:
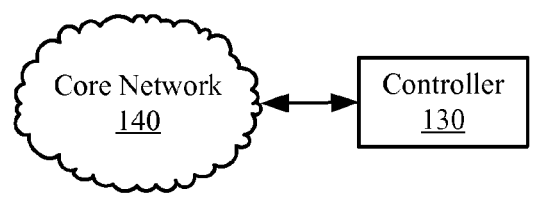

Methods, systems, and devices are described for fast traffic session to paging mode transition. Once the traffic session is terminated (e.g., the call is released), a determination is made as to whether it is safe for a direct traffic session to paging mode transition. The direct traffic session to paging mode transition may include transitioning directly from communication over a TCH for the traffic session to receiving paging information via the PCH without performing pilot signal detection and acquisition, sync channel reception and decoding, etc. If it is determined safe, aspects provide for determining parameters for receipt of paging information via the PCH. For example, paging channel information may be determined for receiving and decoding paging messages via the PCH. Alternatively, a blind detection scheme may be utilized based on one or more last known good parameters for the PCH.

In accordance with some aspects, before-call network parameters may be stored before initiation of a traffic session. The before-call network parameters may be stored while a mobile device is in a paging mode (e.g., an IDLE or sleep mode) and monitoring the PCH. Alternatively, the before-call network parameters may be stored as a part of the call setup process as the mobile device transitions from the paging mode to a traffic session where it communicates via the TCH. While in the traffic session, or as a part of the call release procedure, in-call network parameters may be stored. Upon termination of the traffic session, the mobile device may determine whether a safe transition directly to the paging mode is permissible based on the before-call and in-call network parameters. For example, the mobile device may compare the before- and in-call network parameters using a hierarchical flow. The mobile device may determine synchronization information used for a direct transition from the traffic session to the paging mode.

In some embodiments, the mobile device may have two, independently tunable receivers. A first receiver may be tuned to communicate via the TCH while in the traffic session while a second receiver may be tuned to receive paging information via the PCH while in the traffic session. The mobile device may receive current paging information via the second receiver and may safely transition directly from the traffic session to a paging mode when the traffic session terminates.

In accordance with other embodiments, methods, systems, and devices are described for avoiding network re-synchronization procedures for stationary M2M devices. The described features provide for configuring the M2M device to avoid network re-synchronization procedures and transition directly to the paging mode once the traffic session has terminated. The M2M device may store paging information associated with a base station before initiation of a traffic session. Once the traffic session is terminated, the M2M device may be configured to receive paging messaging from the base station based on the stored paging information. System access information (e.g., network overhead information) may also be stored and the M2M device may determine if the stored system access information has expired. In one example, an overhead timer may be associated with the system access information and initiated when the system access information is stored. As long as the overhead timer has not completed its cycle, the system access information may be considered current. If the timer has expired, the M2M device may validate and, if necessary, update the system access information.

In accordance with other aspects, the described features may permit the stationary M2M device to avoid having to receive and decode certain access configuration messages when the system access information is current and/or valid. The system access information may be received from the base station in one or more access configuration messages. The access configuration messages may include configuration sequence numbers that may be associated with a set of network parameters for the wireless communications system (e.g., network overhead parameters). The stationary M2M device may compare the configuration sequence number from one or more access configuration messages to a configuration sequence number associated with system access information currently stored on the M2M device. If the configuration sequence numbers match, the M2M device may determine that the stored system access information is valid and may disable reception of additional access configuration messages. Alternatively, if the configuration sequence numbers do not match, the M2M device may enable reception of one or more subsequent system access messages to update the stored system access information.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies for multiple access in a wireless system such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of RATs employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of RATs employing FDMA and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes base stations 105 (or cells), mobile devices 115, a controller 130, and a core network 140 (the controller 130 may be integrated into the core network 140). In one example, the controller 130 may be coupled to a set of base stations 105 and provide coordination and control for these base stations 105. The controller 130 may communicate with the base stations 105 via wireless or wireline backhaul. The base stations 105 may also communicate with one another directly or indirectly and/or via wireless or wireline backhaul. The core network 140 may include network entities such as a Mobile Switching Center (MSC), Serving Gateway, Packet Data Serving Node, Packet Data Network Gateway, Mobility Management Entity, Home Location Register (HLR), Visitor Location Register (VLR), etc.

The system 100 may support operation on multiple carriers (waveform signals of different frequencies). Multi-carrier transmitters may transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The system 100 may include multiple RANs with overlapping or non-overlapping coverage areas.

The base stations 105 may wirelessly communicate with the mobile devices 115 via a base station antenna (not shown). The base stations 105 may communicate with the devices 115 under the control of the controller 130 via multiple carriers. Each of the base stations 105 may provide communication coverage for a respective geographic area. In some embodiments, base stations 105 may be referred to as a base transceiver station (BTS), a radio base station, an access point, a radio transceiver, a basic service set (BSS), an extended service set (ESS), a NodeB, eNodeB (eNB), Home NodeB, a Home eNodeB, or some other suitable terminology. The controller 130 may be referred to as a Base Station Controller (BSC), Radio Network Controller (RNC), and/or the like. The coverage area for each base station 105 here is identified as 110-$a$, 110-$b$, or 110-$c$. The coverage area for a base station may be divided into sectors (e.g., 112-$b$-1, 112-$b$-2, 112-$b$-3, etc.). The system 100 may include base stations 105 of different types (e.g., macro, pico, and/or femto base stations). A macro base station may provide communication coverage for a relatively large geographic area (e.g., 35 km in radius). A pico base station may provide coverage for a relatively small geographic area (e.g., 2 km in radius), and a femto base station may provide communication coverage for a relatively smaller geographic area (e.g., 50 m in radius). There may be overlapping coverage areas for different technologies.

The devices 115 may be dispersed throughout the coverage areas 110. Each device 115 may be stationary or mobile. In one configuration, the devices 115 may be able to communicate with different types of base stations such as, but not limited to, macro base stations, pico base stations, and femto base stations, via links 125.

Generally, mobile devices 115 monitor one or more pilot signals from base stations 105 to determine which networks and/or base stations 105 may provide the best downlink and/or uplink channel conditions. The mobile devices 115 may then select a RAN and/or particular base station 105 for communication, synchronize with the base station, and register or "camp" on the network. Registration of a device on a network may also be called network attachment. Synchronization may involve acquiring system reference time from a synchronization channel, and receiving system identification and system parameter information. Registration and/or attachment may include sending an attach request from the device to the RAN, which may allocate a device identifier for the registered device (e.g., Temporary Mobile Subscriber Identity (TMSI), and the like). Registration may also include authentication of the device on the network, bearer context setup in the device and network, and/or mobility management by the network.

Mobility management provides functions associated with tracking registered devices so the network may locate the subscribers for mobile terminated (MT) communications such as calls, short messaging service (SMS), and/or other services that may require MT communications. For locating mobile devices, the network may be divided into network location areas. Each network location area may be associated with a group of base stations 105. Where each base station supports multiple cells or sectors, each network location area may be composed of multiple cells or sectors from multiple base stations.

While "camped" on a particular network or base station, mobile devices 115 may monitor network overhead and paging messaging for the network and update network registration periodically or based on a change to device or network parameters. Network overhead messaging may include various information used for communicating with the particular network. For example, network overhead messaging may include system parameters, access parameters, neighbor lists, channel lists, etc. System parameters may include, for example, paging channel information, parameters related to device registration, and/or parameters to aid pilot acquisition. Access parameters may include, for example, parameters related to the configuration of the Access Channel (e.g., preamble size, maximum size, etc.) and/or control parameters used to stabilize the Access Channel. Neighbor lists may include time offset of pilots and basic configuration for neighboring access points. Channel list parameters may include frequency assignments for paging, access, and/or traffic channels. Network overhead messaging may be sent on, for example, synchronization channels, paging channels (PCHs), common control channels (CCHs), and/or broadcast control channels (BCCHs) of the network.

Generally, while not actively communicating (e.g., via a voice call, etc.), mobile devices 115 may be in a paging mode where they conserve power and enable reception during short periods of time to receive paging information. Mobile devices 115 may communicate with the network in traffic sessions that may be mobile originated (MO) or MT traffic sessions. Upon termination of a traffic session, the mobile device 115 will complete a re-synchronization process before transitioning back to the paging mode. This re-synchronization process may involve pilot signal detection and also reception and decoding of one or more SYNC messages (e.g., over a synchronization channel). During this re-synchronization process, the mobile device 115 cannot monitor the PCH, and may miss an incoming paging message (e.g., a call setup message) from the base station 105. Additionally, the mobile device 115 is not able to originate new traffic sessions (e.g., call, SMS, etc.) during the re-synchronization process. The delay time between the traffic session and receiving paging information may reduce the perceived user experience, especially when users are transmitting and/or receiving short calls and/or messages.

While the system 100 may be designed primarily for wireless communications involving humans, the system 100 may support M2M devices 120 that perform various functions, capture information, and/or communicate information with limited or no human intervention. For example, M2M devices 120 may include sensors and/or meters for monitoring and/or tracking other devices, environmental conditions, etc. M2M devices 120 may be used with various applications such as, but not limited to, remote monitoring, measurement and condition recording, fleet management and asset tracking, in-field data collection, distribution, physical access control, and/or storage, etc.

M2M devices 120 may be standalone devices or, in embodiments, M2M devices 120 may be modules incorporated in other devices. For example, devices (e.g., user equipment, mobile stations, etc.) such as smart phones, cellular phones and wireless communications devices, personal digital assistants (PDAs), tablets, other handheld devices, netbooks, ultrabooks, smartbooks, notebook computers, surveillance cameras, handled medical scanning devices, home appliances, etc. may include one or more M2M device modules 120. In the ensuing description, various techniques are described as applied to communications and processing for a system including a network and one or more M2M devices. It should be understood that the described techniques may be advantageously applied to other devices such as those incorporating M2M modules and/or other wireless communication devices.

The information collected by the M2M devices 120 may be transmitted across a network that includes components of system 100 to a back-end system, such as a server. The transmission of data to/from the M2M devices 120 may be routed through the base stations 105. The base stations 105 may communicate with the M2M devices 120 on a forward link for transmitting signaling and/or information to the M2M devices 120 and a reverse link for receiving signaling and/or information from the M2M devices 120.

Various aspects of M2M devices 120 may pose different challenges for wireless communications networks than traditional wireless communication involving humans. For instance, M2M devices 120 may have aspects that differ from traditional wireless devices with regard to mobility and power efficiency. For example, certain M2M devices 120 may be permanently installed in a static location or have periods of time where their locations may be static, followed by periods of time of mobility. In addition, certain M2M devices 120 may need to be power efficient. For example, some M2M devices may not have a readily accessible power source and extended battery life may be important to reduce required service and maintenance.

In certain embodiments, the system 100 is configured for fast traffic session to paging mode transition in the mobile devices 115 and/or M2M devices 120. The described techniques may be used, for example, by mobile devices 115 to transition directly from the traffic session to a paging mode (e.g., IDLE or SLEEP state, etc) where the PCH is monitored. Generally, the techniques may determine whether it is safe to perform direct traffic session (e.g., using TCH) to paging mode (e.g., monitoring PCH) transition after a call has ended based on comparing certain network parameters stored prior to the call (e.g., before-call network parameters) with network parameters obtained during the call (e.g., during the traffic session while on the TCH). Upon termination of the call, the network parameters are compared and it may be determined whether it is safe to transition directly from TCH to the paging (or IDLE) mode.

In accordance with certain aspects, direct traffic session to paging mode transition may involve the mobile device 115 storing network parameters prior to the call or during call setup. Exemplary before-call network parameters may include a SID/NID identifying which network the mobile device 115 is operating on, a band class (e.g., 800 MHz, 1,900 MHz, etc.), a frequency, and/or a pilot pseudo-noise (PN) offset sequence. Other network parameters may optionally include an assigned frequency received from the network in a Channel Assignment Message (CAM) or an Extended Channel Assignment Message (ECAM). The before-call network parameters stored prior to the call or during the call setup process may, in certain examples, be referred to as a first set of network parameters.

Other aspects may provide for the mobile device 115 to store network parameters while in the traffic session and communicating on the TCH. These in-call network parameters may be received and/or stored as a part of the traffic session or as part of the traffic session termination process (e.g., as the mobile device 115 releases the call). These network parameters may also include a SID/NID, a band class, a frequency, and pilot PN offset sequences associated with the network while in the call. These in-traffic network parameters may, in certain examples, be referred to as a second set of network parameters. The in-call network parameters may be different than the before-call network parameters for various reasons. For example, situations that may change network parameters include intra- or inter-network handoff, handoff to a different active set, and/or changes to frequency or band class due to network loading or changing signal propagation characteristics. In these situations, the mobile device 115 may determine that the traditional re-synchronization process (e.g., pilot signal detection and acquisition and SYNC message reception and decoding) is required to correctly monitor the PCH after a traffic session.

In other embodiments, the system 100 is configured to avoid network re-synchronization procedures for stationary M2M devices. The described techniques may be used, for example, by a stationary M2M device 120 to configure the device 120 to receive paging messaging upon termination of a traffic session without re-synchronization or acquisition of paging information. Before initiation of the traffic session, the M2M device 120 may store paging information associated with, as one example, base station 105-b. The paging information may include information associated with the PCH of the base station 105-b and which permits devices (e.g., devices 115 and/or 120) to receive paging messages from base station 105-b over the PCH. The M2M device 120 may enter into a traffic session with base station 105-b to exchange information or data via the TCH associated with a base station 105-b. When the traffic session is terminated, the M2M device 120 may be configured to receive paging messaging from the base station 105-b according to the stored paging information.

According to certain aspects, the M2M device 120 may receive and store, before the traffic session, system access information associated with base station 105-b. Upon termination of the traffic session, the M2M device 120 may determine whether the stored system access information has expired. For example, the stored system access information may be considered current if an associated overhead timer has not completed its cycle. If the overhead timer has completed the cycle, the M2M device 120 may validate the stored system access information.

The stored system access information may be validated based on comparing a configuration sequence number associated with the stored system access information with a current configuration sequence number. The current configuration sequence number may be transmitted by base station 105-b in one or more access configuration messages. For example, the M2M device 120 may receive one or more access configuration messages including the current configuration sequence number and compare the current configuration sequence number with the configuration sequence number of the stored system access information. If the compared configuration sequence numbers match, the M2M device 120 may determine that the stored system access information is valid and, therefore, does not need to be updated. As such, the M2M device 120 may disable reception of one or more subsequent access configuration messages.

Figure 2:
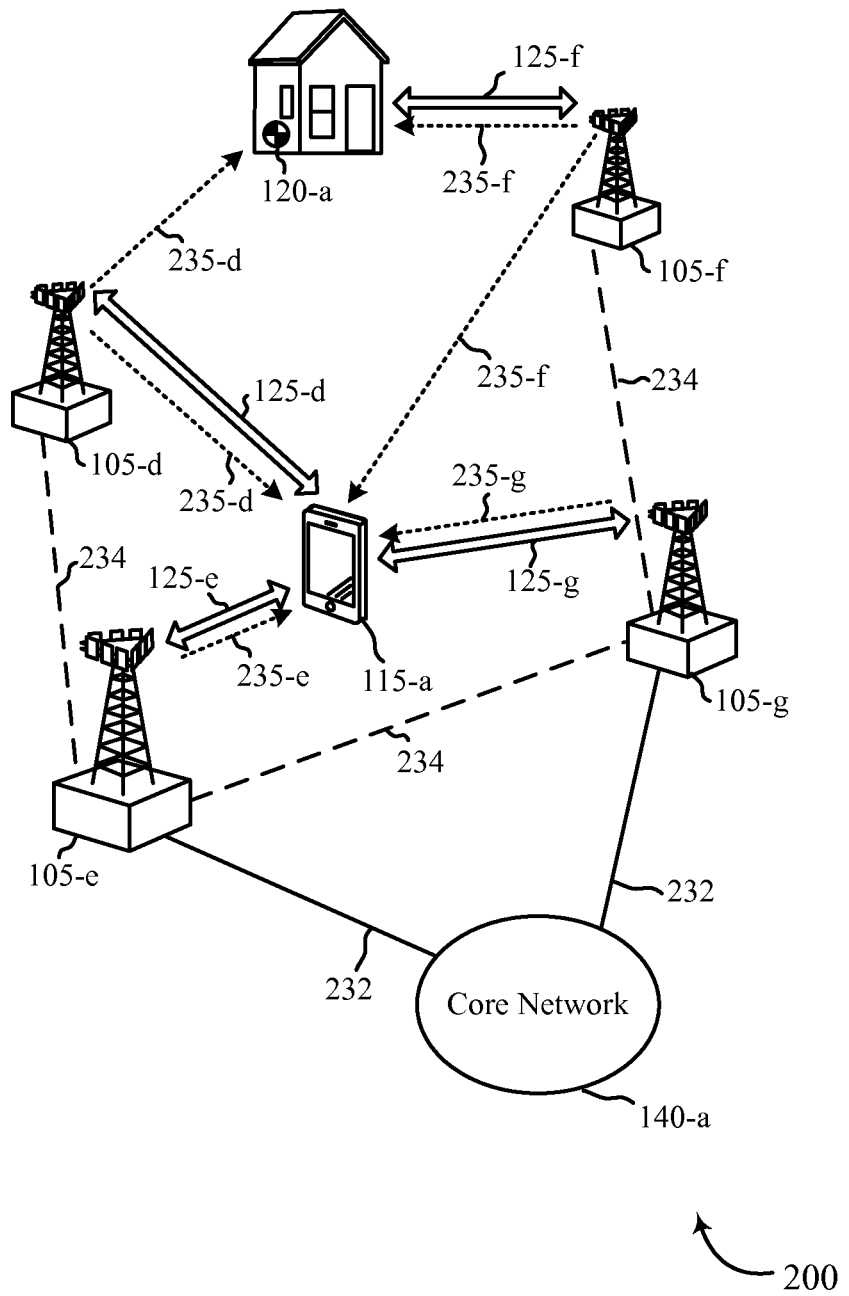
FIG. 2 is a diagram illustrating an example of a wireless communications system.

FIG. 2 illustrates a wireless communications network 200 configured for fast traffic session to paging mode transition in accordance with various embodiments. Wireless communications network 200 may illustrate, for example, aspects of wireless communications network 100. Wireless communications network 200 may include a mobile device 115-a, a base station 105-d, a base station 105-e, a base station 105-f, and a base station 105-g. Base stations 105-d, 105-e, 105-f, and 105-g may be connected via backhaul links 232 to core network 140-a (only two of the backhaul links 232 being shown for clarity). The base stations 105-d, 105-e, 105-f, and 105-g may be connected with each other via backhaul links 234 (only three of the backhaul links 234 being shown for clarity).

In FIG. 2, mobile device 115-a may be positioned at a location wherein it may receive pilot signals 235-d, 235-e, 235-f, and 235-g from base stations 105-d, 105-e, 105-f, and 105-g, respectively. The mobile device 115-a may determine a strongest pilot signal and communicate with the base station 105 associated with the strongest pilot signal for registration on the network. For example, the mobile device 115-a may determine that pilot signal 235-e is the strongest pilot signal and register with the base station 105-e.

Once registered, mobile device 115-a may receive various network parameters via the PCH from base station 105-e. For example, the mobile device 115-a may receive a System Parameter Message (SPM), a PCH Active Set PN message, and/or an ECAM message on the PCH from the base station 105-e. The SPM may include the SID/NID, band class, and frequency components of the network parameters. The PCH Active Set PN message may include an Active Set, a Candidate Set, a Neighbor Set, and a Remaining Set. The Active Set may include base stations having the strongest pilot signals. The Candidate Set may include base stations with pilots strong enough for communication, but not listed in the Active Set. The Neighbor Set may include base stations that are not in the Active Set or Candidate Set, but that are likely candidates for handoff. The Remaining Set may include other base stations in the network which are not in another set. In the example shown in FIG. 2, the Active Set of base stations for the mobile device 115-a may be base stations 105-d, 105-e, and 105-g, whereas base station 105-f may be listed in the Candidate Set. The mobile device 115-a may store some, or all of the before-call network parameters (e.g., the SID/NID, band class, frequency, etc).

During a traffic session, the mobile device 115-a may communicate via a TCH with the base stations defined in its Active Set (e.g., via links 125-d, 125-e, and/or 125-g with base stations 105-d, 105-e, and 105-g, respectively). The mobile device 115-a may receive and store in-call network parameters associated with the TCH from these base stations while in the traffic session. For example, the mobile device 115-a may receive and store network parameters associated with the SID/NID, the band class, the frequency, and the Active Set PN.

Various network parameters may change during the traffic session. For instance, the mobile device 115-a may move to a new position wherein it is closer to base station 105-f such that pilot 235-f becomes stronger than one of pilots 235-d, 235-e, and/or 235-g. As such, the core network 140-a may change the Active Set assigned to the mobile device 115-a. Similarly, other base stations may be added or dropped from the Active Set assigned to the mobile device 115-a during the traffic session or the mobile device 115-a may be handed off to a different Active Set. Additionally, the Active Set may modify various parameters used for communicating with mobile device 115-a due to network loading or other factors. As the Active set changes and/or the mobile device is handed off to base stations outside the initial Active Set, the band class and/or frequency for the mobile device 115-a may change. As such, the in-call network parameters may be different from the before-call network parameters stored by the mobile device 115-a.

As one example of changing network parameters, any of base stations 105-d, 105-e, 105-f, and/or 105-g may have the same or different network parameters. For example, the base stations 105-*e* and 105-*f* may operate on different SID/NID, band class, frequency, etc. In that situation, the mobile device 115-*a* may compare the before-call network parameters (i.e., network parameters associated with base station 105-*e* before the call and while monitoring the PCH) with the in-call network parameters (i.e., network parameters associated with base station 105-*f* during the traffic session) and determine that it is not safe to transition directly from the TCH to the paging mode where the PCH of base station 105-*f* is monitored. In that instance, traditional re-synchronization procedures may be followed. In accordance with another example, the network parameters of base station 105-*e* and base station 105-*f* may be the same. In that situation, the mobile device 115-*a* may compare the first and second set of network parameters and determine that direct TCH to paging mode transition is safe. In that instance, the mobile device 115-*a* may transition directly from the TCH to the paging mode.

Wireless communications network 200 may also include stationary M2M device 120-*a*. M2M device 120-*a* may be located such that pilot 235-*f* is the strongest received pilot and, as a result, M2M device 120-*a* may register with base station 105-*f*. While registered with base station 105-*f*, the M2M device 120-*a* may generally be in a sleep state or paging mode where the M2M device 120-*a* is in a low-power mode and enables reception of paging information based on a slotted paging cycle. To send or receive information, the M2M device 120-*a* may enter into a traffic session with base station 105-*f*, and then transition back to the sleep state once the traffic session is complete. According to certain aspects, the M2M device 120-*a* may store, before the traffic session, paging information associated with the base station 105-*f* and then transition directly from the traffic session to the paging mode based on the stored paging information when the traffic session is complete. Therefore, the stationary M2M device 120-*a* may avoid network re-synchronization procedures typically associated with transitioning from the traffic session to a sleep state. As such, the M2M device 120-*a* may return to the sleep state more quickly and, for example, conserve power.

Various aspects may also provide for the M2M device 120-*a* to store system access information associated with base station 105-*f*. The system access information may include information indicative of various network parameters (e.g., SID/NID, band class, Active Set PN offset sequence), and/or information related to configuration of access channels (e.g., preamble size, maximum size, stabilization parameters, etc.) associated with the base station 105-*f*. System access information may be transmitted by base stations 105 in a number (e.g., typically seven or eight) access configuration messages that each include portions of the system access information. Collectively, the information in the access configuration messages may be used by the M2M device 120-*a* for access procedures to initiate communication with base station 105-*f*. The access configuration messages may include a configuration sequence number associated with a set of network parameters. As one example, the M2M device 120-*a* may utilize a look-up table to determine the applicable network parameters associated with the base station 105-*f* based on the received configuration sequence numbers.

The M2M device 120-*a* may store the system access information and associate the stored system access information with an overhead timer. The stored system access information may be considered current for the duration of the overhead timer cycle and considered expired once the timer has completed its cycle. In accordance with certain aspects, the M2M device 120-*a* may be configured to, after the traffic session has ended, determine if the stored system access information has expired. If current, the M2M device 120-*a* may be configured to disable reception of one or more access configuration messages. If expired (e.g., the overhead timer has completed its cycle), the M2M device 120-*a* may validate and, if necessary, update the stored system access information. The M2M device 120-*a* may validate the stored system access information by comparing the configuration sequence number of the stored system access information with a current configuration sequence number.

Figure 3:
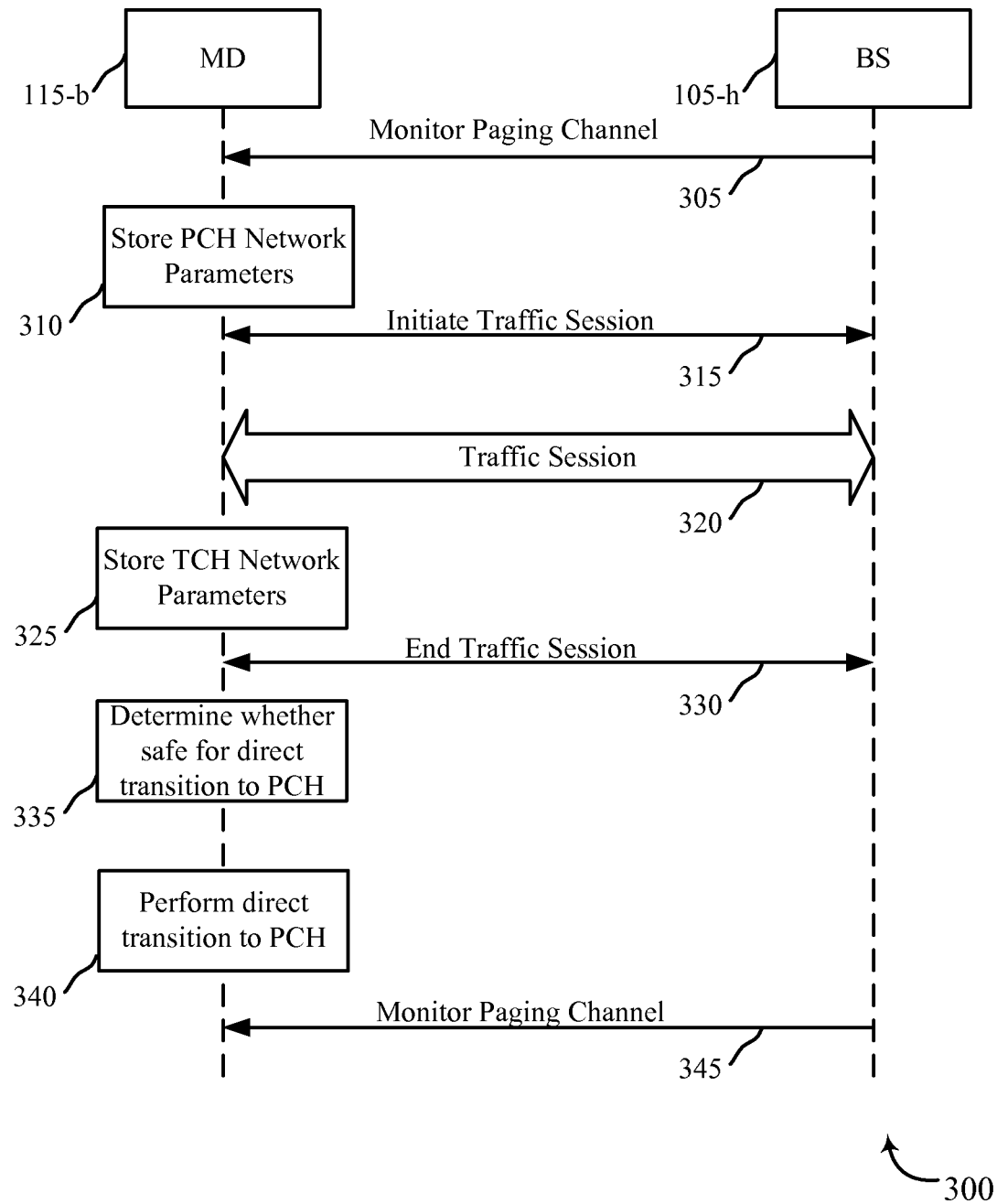
FIG. 3 is a diagram illustrating an exemplary communication flow between a communications device and a base station of the wireless communications system.

FIG. 3 is a diagram illustrating a communication flow 300 for direct traffic session to paging mode transition in accordance with various embodiments. Communication flow 300 may be used, for example, by the mobile devices 115 of FIGS. 1 and/or 2 for direct traffic session to paging mode transitions.

At 305, the mobile device 115-*b* is in a paging mode where it monitors the PCH from the base station 105-*h* (e.g., a SLEEP or IDLE state where the mobile device 115-*b* monitors the paging channel for paging and/or overhead information associated with the base station 105-*h*). The mobile device 115-*b* may monitor the PCH according to paging information associated with the base station 105-*h* (e.g., a paging channel rate, a paging slot cycle, etc.). The mobile device 115-*b* may store before-call PCH network parameters while in the paging mode at 310. The mobile device 115-*b* may receive the before-call network parameters over the PCH while in the paging mode. At 315, a traffic session is initiated between the mobile device 115-*b* and the base station 105-*h*. The traffic session may be initiated by the mobile device 115-*b* or by the base station 105-*h*. As a part of the call setup procedure for starting the traffic session, the mobile device 115-*b* may, alternatively, receive and store the before-call network parameters.

At 320, the mobile device 115-*b* and the base station 105-*h* exchange voice and/or data information, as determined by the traffic session. While exchanging voice and/or data information in the traffic session at 320, the mobile device 115-*b* may receive network parameters related to the traffic session based on changes to the communication links of the mobile device 115-*b* (e.g., the Active Set may change, handover may occur, etc). The received in-call network parameters associated with the TCH during the traffic session are stored at 325. The traffic session ends at 330, where the mobile device 115-*b* and the base station 105-*h* complete a call-release procedure. Additionally or alternatively, the mobile device 115-*b* may receive and store the in-call network parameters as a part of the call-release procedure.

At block 335, the mobile device 115-*b* may determine whether or not it is safe for a direct transition from the traffic session to a paging mode. The determination may be based on comparing the before- and in-call network parameters stored at 310 and 325, respectively. For example, if certain before- and in-call network parameters substantially correspond, the mobile device 115-*b* may determine that it is safe for a direct traffic session to paging mode transition. The before- and in-call network parameters may be compared in a hierarchical flow, as will be discussed in more detail below.

Once it has been determined safe at 335, paging channel information based on the stored network parameters may be used at 340 for direct transition from the traffic session back to the paging mode at 345 where the PCH may be immediately monitored, rather than completing the traditional re-synchronization procedure. In embodiments, the mobile device 115-*b* performs the direct transition to the paging mode without network assistance. For example, the mobile device 115-*b* may determine the paging channel information (synchronization information, paging channel rate, paging slot cycle, etc.) for monitoring the paging channel based on parameters received prior to the traffic session and in the traffic session without receiving a message related specifically to updating the paging channel information for direct transition.

Figure 4:
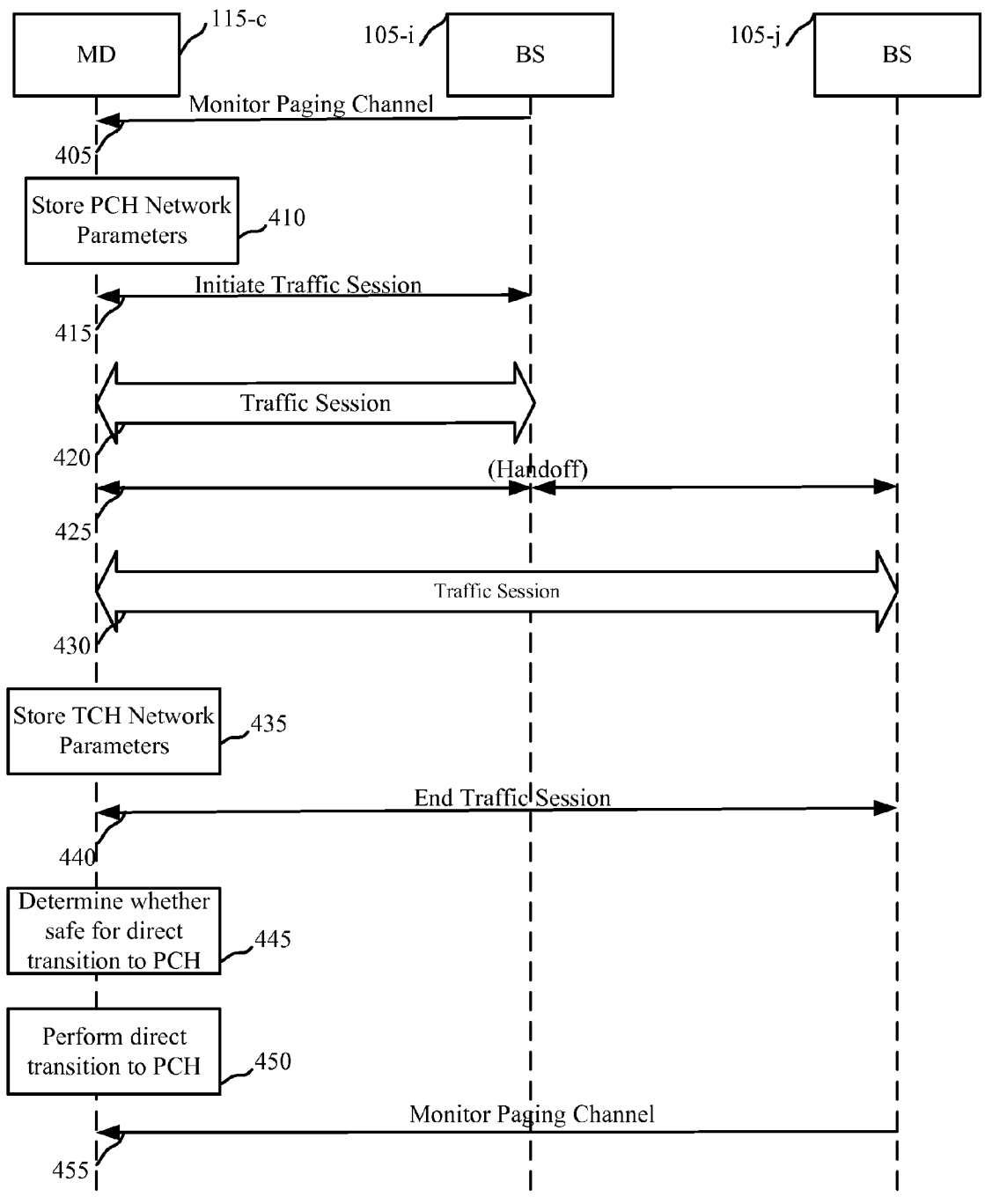
FIG. 4 is another diagram illustrating a communication flow between a communications device and two base stations of the wireless communications system in accordance with a handover procedure.

FIG. 4 is a diagram illustrating another exemplary communication flow 400 for direct traffic session to paging mode transition in accordance with various embodiments. Communication flow 400 may be used, for example, by the mobile devices 115 of FIGS. 1 and/or 2 for direct traffic session to paging mode transitions.

At 405 the mobile device 115-*c* is registered or "camped" on the base station 105-*i* and in a paging mode where it monitors the PCH from the base station 105-*i* (e.g., in a SLEEP or IDLE state where the mobile device 115-*c* monitors the paging channel to receive paging and/or overhead information associated with the base station 105-*i*). The mobile device 115-*c* may monitor the PCH according to paging information associated with the base station 105-*i* (e.g., a paging channel rate, a paging slot cycle, etc.). The mobile device 115-*c* may store these before-call PCH network parameters while in the paging mode at 410. At 415, a traffic session is initiated between the mobile device 115-*c* and the base station 105-*i*. The traffic session may be initiated by the mobile device 115-*c* or by the base station 105-*i*. As a part of the call setup procedure for starting the traffic session, the mobile device 115-*c* may, alternatively, receive and store the before-call network parameters. The before-call network parameters may include a SID/NID, a band class, a frequency channel, or a pilot PN sequence associated with the base station 105-*i*.

At 420, the mobile device 115-*c* and the base station 105-*i* exchange voice and/or data information during the traffic session. While exchanging voice and/or data information in the traffic session 420, the mobile device 115-*c* may receive and store in-call network parameters related to the traffic session based on communication links of the base station 105-*i*. The in-call network parameters may include a SID/NID, a band class, a frequency channel, and/or a pilot PN sequence associated with the base station 105-*i*. At 425, the mobile device 115-*c* is handed over from the base station 105-*i* to the base station 105-*j*. As discussed, a variety of situations may necessitate the handover. Once the handover process is complete, the mobile device 115-*c* is registered on the base station 105-*j* such that base station 105-*j* continues the traffic session with the mobile device 115-*c* at 430. As a part of the handover process or once the mobile device 115-*c* is registered with the base station 105-*j* and in the traffic session 430, the mobile device 115-*c* receives and stores (e.g., updates) the in-call network parameters at 435 to reflect the network parameters associated with the base station 105-*j*. That is, the mobile device 115-*c* may replace the in-call network parameters received and stored while in traffic session 420 with base station 105-*i* with the new in-call network parameters associated with base station 105-*j*. The mobile device 115-*c* may receive the in-call network parameters associated with the base station 105-*j* over a TCH of the base station 105-*j*. The traffic session ends at 440, where the mobile device 115-*c* and the base station 105-*j* complete a call release procedure. Additionally, or alternatively, the mobile device 115-*c* may receive and store the in-call network parameters as a part of the call release procedure.

At 445, the mobile device 115-*c* may determine whether or not it is safe for a direct transition from the traffic session to a paging mode. The determination may be based on comparing the before- and in-call network parameters stored at 410 and 435, respectively. For example, if certain before- and in-call network parameters substantially correspond, the mobile device 115-*c* may determine that it is safe for a direct traffic session to paging mode transition. The before- and in-call network parameters may be compared in a hierarchical flow as described in more detail below.

Figure 5:
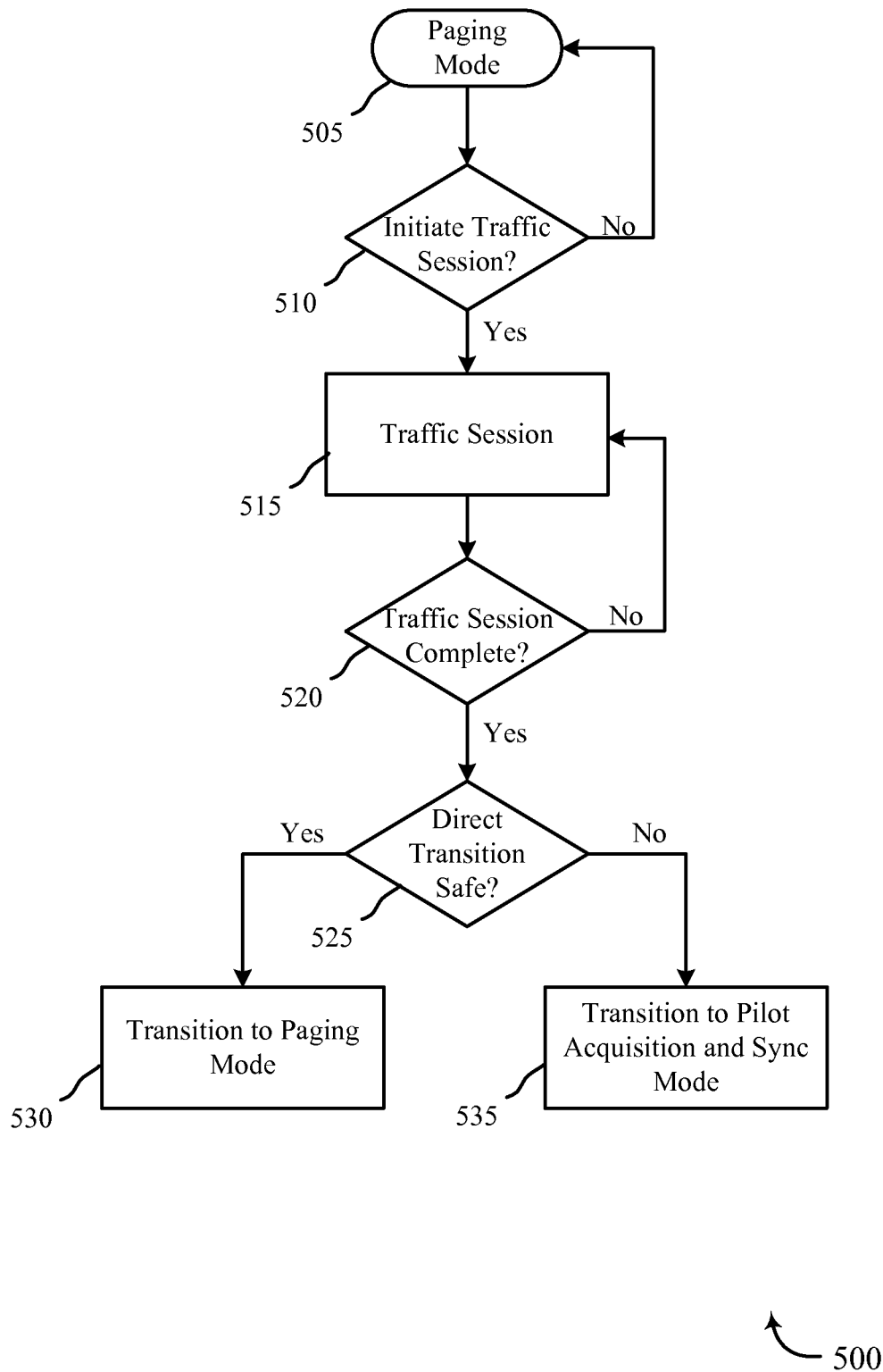
FIG. 5 is a process diagram illustrating transition from a traffic session to a paging mode where the paging channel is monitored.

FIG. 5 is a process diagram illustrating an exemplary process 500 for a direct transition from a traffic session to a paging mode, in accordance with aspects of the present disclosure. The process 500 may implement, for example, aspects of wireless communications networks 100 and/or 200, as well as the communication flows 300 and/or 400. At 505, the process 500 starts with a mobile device in a paging mode. For instance, any of the mobile devices 115 may be registered with a base station and in a paging mode where the device monitors the PCH according to paging information associated with the base station. Before-call network parameters may be received over the PCH and/or stored while in the paging mode at 505. At 510, the mobile device determines whether a traffic session should be initiated is made. The traffic session may be initiated by the mobile device or by the base station. If no traffic session is initiated, the process loops back to the paging mode 505 where the mobile device continues to monitor the PCH for paging and/or overhead information. If a traffic session is initiated, the process moves to 515 where the mobile device and base station enter into the traffic session. During the traffic session at 515, voice and/or data information is exchanged, depending on the nature of the traffic session. The voice and/or data information may be exchanged via a TCH during the traffic session.

In-call network parameters may be received and/or stored during the traffic session 515. The in-call network parameters may relate to communication links associated with the traffic session. A determination as to whether the traffic session is complete is made by the mobile device at 520. If the traffic session is not complete, the process 500 loops back to 515 where the mobile device and base station may continue the traffic session 515. The in-call network parameters continue to be received and/or stored while in the traffic session. As such, changes in the communication links associated with the traffic session are reflected in the stored in-call network parameters (e.g., changes relating to handoff, varying network loads, etc.).

If the traffic session is complete, the process 500 moves to 525 where the mobile device determines whether or not it is safe for a direct transition from the traffic session to the paging mode. The determination may be based on comparing the before- and in-call network parameters. For example, if certain before- and in-call network parameters substantially correspond, the mobile device may determine that it is safe for a direct transition from the traffic session to the paging mode. The before- and in-call network parameters may be compared in a hierarchical flow. If the mobile device determines that it is safe for a direct traffic session to paging mode transition, the mobile device transitions directly to the paging mode at 530 where the PCH may be immediately monitored. If the mobile device determines that it is not safe for a direct traffic session to paging mode transition, the process 500 moves to 535 where the mobile device completes the traditional re-synchronization procedure of pilot acquisition and sync decoding.

Figure 6:
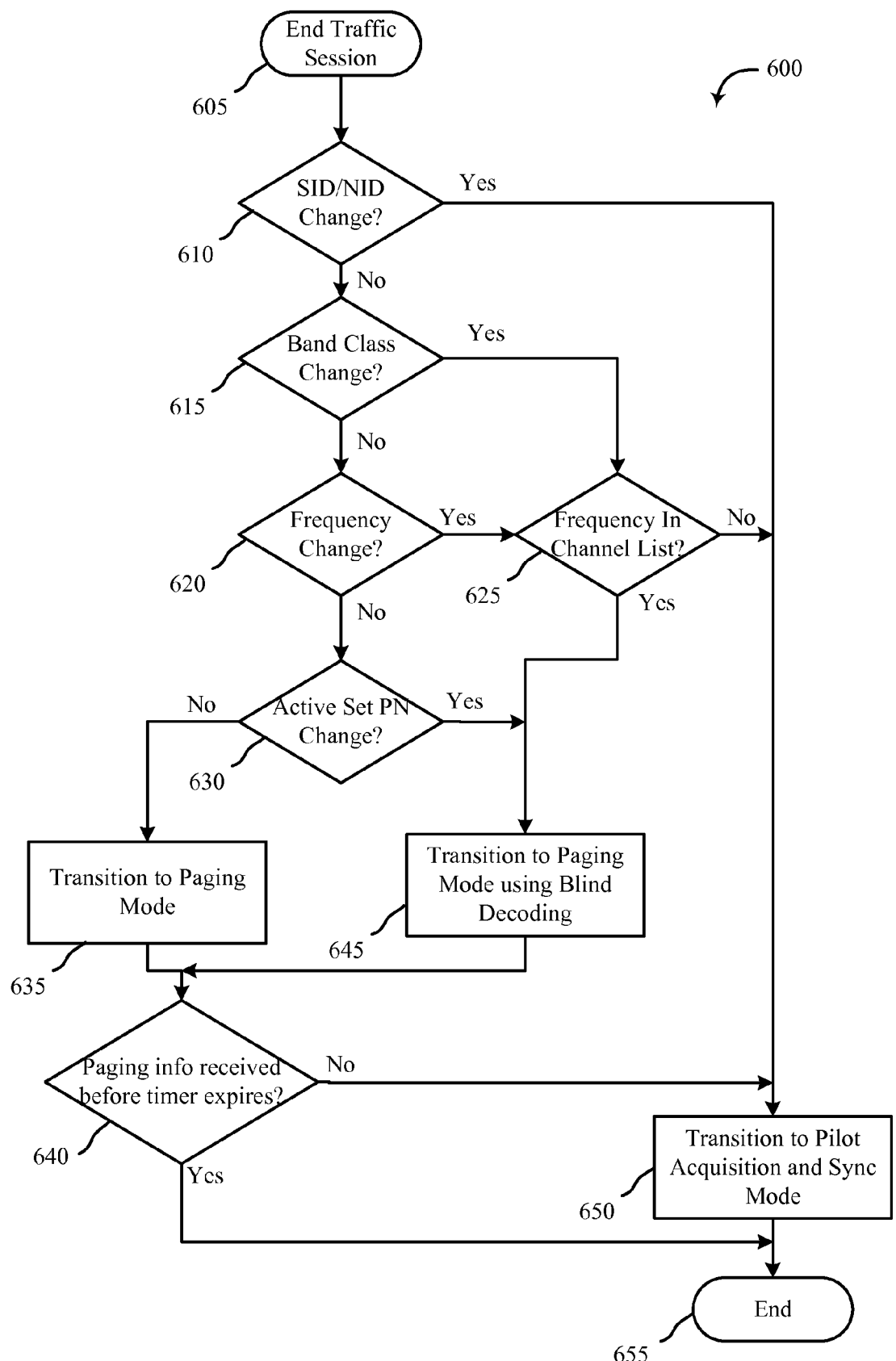
FIG. 6 is another process diagram illustrating, in greater detail, an exemplary hierarchical flow for determining whether it is safe to transition directly from a traffic session to a paging mode.

FIG. 6 is a process diagram illustrating an exemplary process 600 for a direct transition from a traffic session to paging mode, in accordance with aspects of the present disclosure. More particularly, the process 600 illustrated in FIG. 6 shows an exemplary hierarchical flow for determining whether it is safe to transition directly from the traffic session to the paging mode. The process 600 may implement, for example, aspects of wireless communications networks 100 or 200, the communication flows 300 or 400, as well as aspects of the process 500. The process 600 begins at 605 where a traffic session between a mobile device and a base station has ended. As discussed above, before- and in-call network parameters have been received over the PCH and TCH, respectively, and subsequently stored by the mobile device. The before- and in-call network parameters may include, for example, a SID/NID, a band class, a frequency channel, an Active Set PN offset sequence, and/or other parameters.

Once the traffic session has ended at 605, the process 600 moves to 610 where the mobile device may compare the SID/NID associated with the before-call network parameters with the SID/NID associated with the in-call network parameters. If the SID/NID parameters do not match, this indicates that the mobile device has switched to a different network during the traffic session and it is not safe to transition directly from the traffic session to the paging mode. In this situation, the process 600 moves to 655 where the mobile device completes the traditional pilot acquisition and SYNC message decoding re-synchronization procedure.

If the SID/NID matches, then the process 600 moves to 615 where the mobile device compares the band class associated with the before-call network parameters to the band class associated with the in-call network parameters. If these network parameters do not match, the mobile device may check to see if the in-traffic band class is listed in a frequency channel list at 625. If the band class network parameters match, the mobile device may check to see if the frequency associated with the before-call network parameters matches the frequency associated with the in-call network parameters at 620. Similarly, if the frequency network parameters do not match, the mobile device may again check to see if the in-traffic frequency is listed in the frequency channel list at 625. If, at 615 and/or 620, either the band class or the frequency have changed and are not listed in the frequency channel list at 625, the mobile device determines that it is not safe to transition directly from the traffic session to the paging mode. In this situation, the process 600 moves to 655 where the mobile device completes the pilot acquisition and SYNC message decoding re-synchronization procedure.

If the in-call band class and frequency are listed in the frequency channel list, the mobile device may determine that it is safe for a direct traffic session to paging mode transition. In embodiments, when the band class and/or frequency has changed (but the in-call band class and/or in-call frequency are in the channel list), the mobile device may transition directly from the traffic session to the paging mode using blind PCH decoding at 645. Blind PCH decoding refers to, for example, the mobile device attempting to decode traffic on the PCH using a last known good decoding scheme and/or a predetermined series of paging channel rates.

If the band class and frequency network parameters match at 615 and 620, the process 600 moves to 630 where the mobile device compares the Active Set PN offset sequence network parameters. If these network parameters match, then the mobile device may determine at 635 that it is safe to transition directly from the traffic session to the paging mode. If the Active Set PN offset sequences do not match, the mobile device determines that it is safe to transition to the paging mode using the blind decoding scheme at 645, as discussed above.

In accordance with even further aspects, the mobile device may utilize a timer (e.g., a transition timer) to govern a reasonable amount of time to acquire the paging channel based on stored paging channel information. The timer may be initiated as a part of the call termination process and, once expired, automatically trigger the mobile device to revert to the standard re-synchronization process at 640. For example, once the mobile device transitions to the paging mode at 635, the mobile device may determine if it is able to correctly synchronize and decode to the PCH before the timer expires. If, at 640, the timer has expired before the mobile device correctly synchronizes and/or decodes the PCH, the process 600 moves to 650 where the mobile device completes the pilot acquisition and sync message decoding re-synchronization procedure. If the mobile device correctly synchronizes and decodes the PCH before the expiration of the timer, the process 600 ends at 655.

Figure 7:
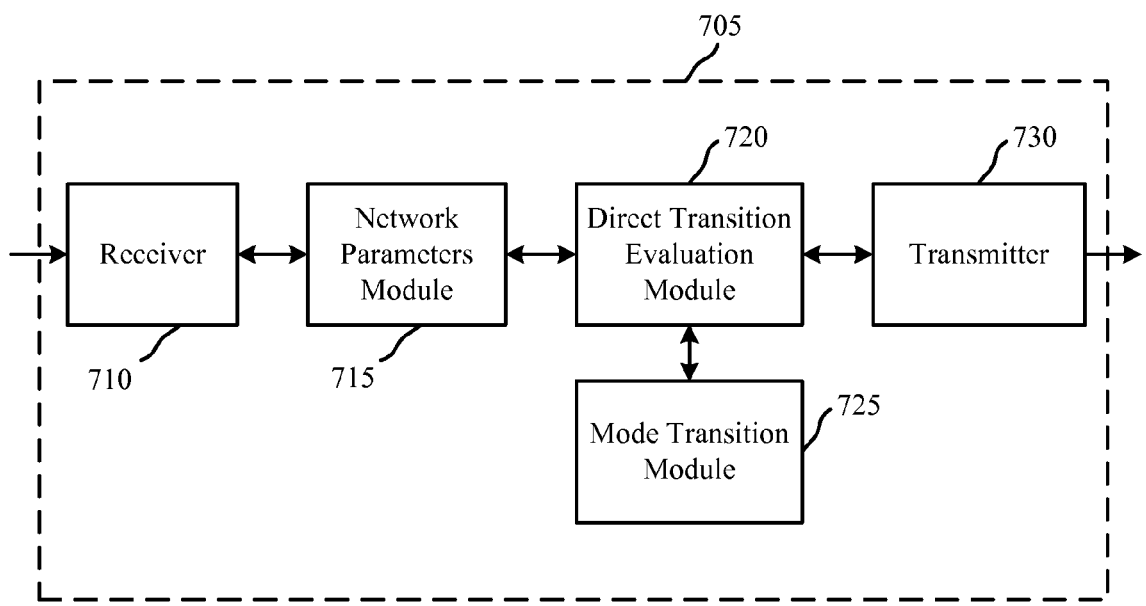
FIG. 7 is a block diagram showing aspects of an exemplary device for a direct traffic session to paging mode transition.

FIG. 7 is a block diagram 700 of a device 705 for a direct traffic session to paging mode transition in accordance with various embodiments. The device 705 may implement aspects and/or components of the mobile devices 115 of FIGS. 1-4 as well as implementing aspects of flows 300 and/or 400 and/or processes 500 and/or 600. The device 705 may be configured to safely transition directly from a traffic session to a paging mode upon completion of the traffic session. The device 705 may be a processor.

Device 705 includes a receiver 710, a network parameters module 715, a direct transition evaluation module 720, a mode transition module 725, and a transmitter 730, which each may be in communication, directly or indirectly, with each other. The receiver 710 may receive network parameters from a base station 105 (e.g., via the PCH) while device 705 is in a paging mode or as part of a call setup procedure. The network parameters module 715 is configured to store these before-call network parameters. A traffic session may be initiated between the base station 105 and the device 705. While in the traffic session, the receiver 710 may receive various in-call network parameters (e.g., via a TCH). The in-call network parameters may be received from one or more base stations of an active set of base stations that may vary throughout the traffic session. The network parameters module 715 may store these in-call network parameters. Exemplary before- and in-call network parameters include, but are not limited to, a SID/NID, band class, frequency, etc. According to other aspects, the network parameters module 715 may further be configured to retrieve the stored network parameters from, for example, a memory module (e.g., memory 940 of mobile device 115-*d*). The network parameters module 715 may be configured to provide the stored network parameters to the direct transition evaluation module 720.

Upon termination of the traffic session, the direct transition evaluation module 720 may determine whether it is safe for a direct traffic session to paging mode transition based on the stored before-call and in-call network parameters. The direct transition evaluation module 720 may determine that it is safe for direct traffic session to paging mode transition without assistance from the network, e.g., without requiring the network to determine, package, and/or transmit additional paging channel information to the device 705. According to certain aspects, the determination of safe transition is made based on comparing some or all of the before- and in-call network parameters using a hierarchical flow. For example, the determination may be made by following the hierarchical flow described above with reference to FIG. 6.

As discussed above, various situations might result in the before-call network parameters being different from the in-call network parameters. As one example, the device 705 may move from the coverage area of a source base station to the coverage area of a target base station (see FIG. 2 and its associated description). The network parameters associated with the source base station may be the same as, or different than the network parameters associated with the target base station. In instances where at least some of the network parameters are the same, the direct transition evaluation module 720 may determine that it is safe for direct traffic session to paging mode transition. In instances where some or all of the network parameters are different, the direct transition evaluation module 720 may determine that direct traffic session to paging mode transition is not safe. In this instance, the device 705 may be configured to perform traditional re-synchronization procedures and proceed to pilot acquisition and sync message decoding.

According to certain aspects, the direct transition evaluation module 720 may communicate whether it is safe to perform a direct transition to the mode transition module 725. If it has been determined safe for direct transition, the mode transition module 725 may be configured to change an operating mode of the device 705 from the traffic session where the device 705 is communicating on the TCH (e.g., via receiver 710, transmitter 730, etc.) to a paging mode where the device 705 immediately monitors the PCH to receive paging information. If it has been determined unsafe for direct transition, the mode transition module 725 may be configured to change the mode of the device 705 from the traffic session mode to a re-synchronization mode where the device 705 may complete a pilot acquisition and SYNC message reception and decoding procedure.

Figure 8:
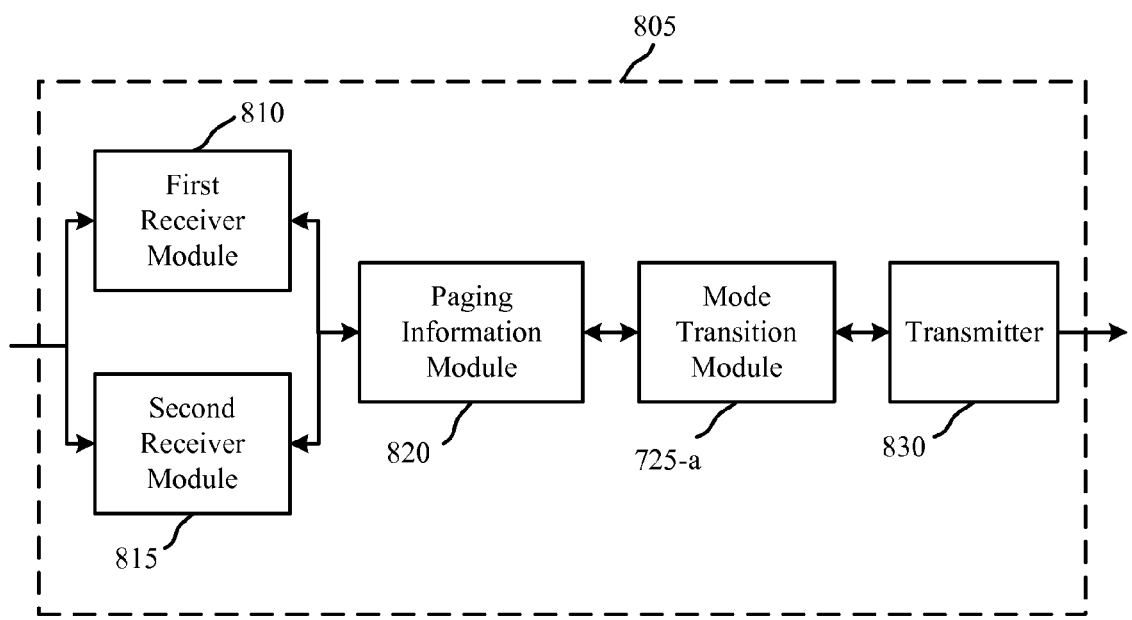
FIG. 8 is a block diagram showing aspects of yet another exemplary device for a direct traffic session to paging mode transition.

FIG. 8 is a block diagram 800 of another exemplary device 805 for a direct traffic session to paging mode transition in accordance with various embodiments. The device 805 may implement aspects and/or components of the mobile devices 115 of FIGS. 1-4, the device 705 of FIG. 7, as well as aspects of flows 300 and/or 400 and/or processes 500 and/or 600. The device 805 may be a processor. The device 805 includes a first receiver module 810, a second receiver module 815, a paging information module 820, a mode transition module 725-a, and a transmitter 830. These modules may be in communication, directly or indirectly, with each other. In one embodiment, functionality of the device 805 may be implemented as one or more components of the mobile device 115-d of FIG. 9 (e.g., the processor module 925, the paging information module 820-a, the mode transition module 725-b, etc.).

The device 805 may be configured to transition directly from a traffic session to a paging mode. The first and second receiver modules 810 and 815, respectively, may each be independently tunable to receive information on different frequencies and/or channels. Prior to a traffic session, the device 805 may be in a paging mode where the first receiver module 810 or the second receiver 815 may monitor the PCH of a base station 105. Upon initiation of a traffic session between the base station 105 and the device 705, the first receiver module 810 may be tuned to communicate via the TCH while the second receiver module 815 may be tuned to receive paging information via the PCH, or vice-versa. As such, the device 805 may be able to communicate data and information of the traffic session with the base station via the TCH while continuing to receive paging information. The paging information module 820 may receive the current paging information and/or network parameters from the first and/or second receiver modules 810 and 815. The paging information module 820 may maintain current paging information associated with the base station 105 while in the traffic session.

Upon termination of the traffic session, the mode transition module 725-a may be configured to perform a direct transition from the traffic session to the paging mode. The mode transition module 725-a may perform the direct transition based on paging information from the paging information module 820. The direct transition may avoid traditional re-synchronization procedures such as pilot acquisition and sync message decoding.

Figure 9:
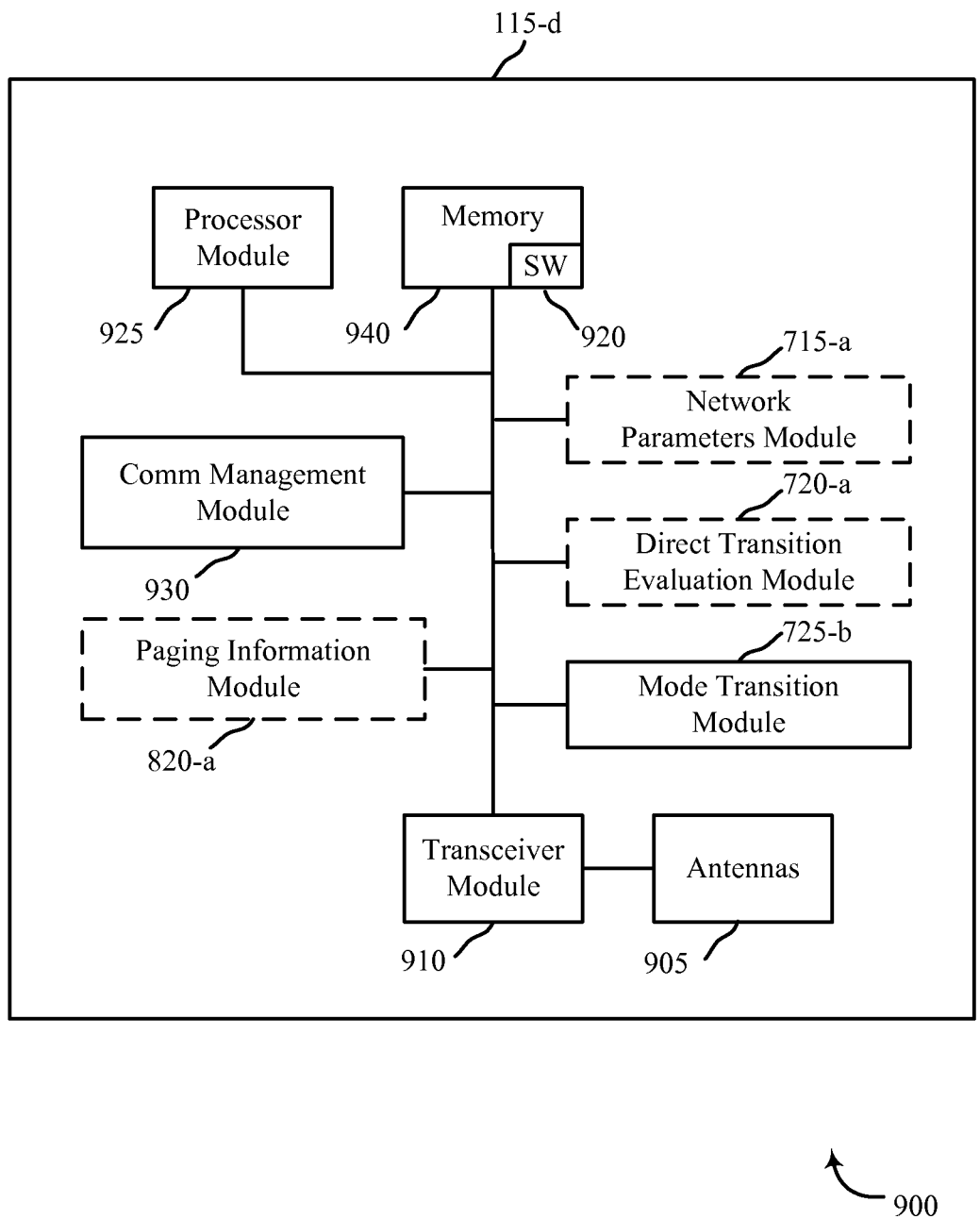
FIG. 9 is a block diagram of an example of a communications device.

FIG. 9 is a block diagram 900 of an exemplary mobile device 115-d configured for direct transition from a traffic session to a paging mode. The mobile device 115-d may illustrate, for example, aspects of mobile devices 115 of FIGS. 1-4, aspects of the devices 705 and/or 805 of FIGS. 7-8, as well as aspects of the processes 500 and/or 600. In embodiments, functionality of the devices 705 and/or 805 may be implemented as one or more components of the mobile device 115-d (e.g., the processor module 925, the network parameters module 715-a, the direct transition evaluation module 720-a, the mode transition module 725-b, the paging information module 820-a, etc.). The mobile device 115-d may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-d may have an internal power supply (not shown), such as a small battery, to facilitate mobile operation.

The mobile device 115-d includes antennas 905, a transceiver module 910, memory 940, and a processor module 925, which each may be in communication, directly or indirectly, with each other (e.g., via one or more buses). The transceiver module 910 is configured to communicate bi-directionally, via the antennas 905 and/or one or more wired or wireless links, with one or more networks, as described above. For example, the transceiver module 910 may be configured to communicate bi-directionally with a base station 105. The transceiver module 910 may include a modem configured to modulate the packets and provide the modulated packets to the antennas 905 for transmission, and to demodulate packets received from the antennas 905. While the mobile device 115-d may include a single antenna, the mobile device 115-d will typically include multiple antennas 905 for multiple links. The transceiver module may have multiple transmitters and/or receivers for transmitting and/or receiving information over multiple channels and/or frequencies at the same time. For example, the transceiver module 910 may include receivers 810 and 815 of FIG. 8.

The memory 940 may include random access memory (RAM) and read-only memory (ROM). The memory 940 may store computer-readable, computer-executable software code 920 containing instructions that are configured to, when executed, cause the processor module 925 to perform various functions described herein (e.g., direct traffic session to paging mode transition). Alternatively, the software 920 may not be directly executable by the processor module 925 but be configured to cause the computer (e.g., when compiled and executed) to perform functions described herein. The processor module 925 may include an intelligent hardware device, e.g., a central processing unit (CPU), a microcontroller, an application specific integrated circuit (ASIC), etc.

According to the architecture of FIG. 9, the mobile device 115-*d* may further include a communications management module 930, a network parameters module 715-*a*, a direct transition evaluation module 720-*a*, a mode transition module 725-*b*, and/or a paging information module 820-*a*. By way of example, these modules may be components of the mobile device 115-*d* in communication with some or all of the other components of the mobile device 115-*d* via a bus. Alternatively, functionality of these modules may be implemented as a component of the transceiver module 910, as a computer program product, and/or as one or more controller elements of the processor module 925. The communications management module 930 may manage communications with base station 105 and/or other mobile devices.

The mode transition module 725-*b* may control the current device state. In some embodiments, the mode transition module 725-*b* may include hardware, code, instructions, etc., configured to control transition between an active state where the device 115-*d* is in a traffic session and a paging mode. The mode transition module 725-*b* may be configured to safely transition the mobile device 115-*d* directly from the traffic session to the paging mode upon completion of a traffic session. The mode transition module 725-*b* may implement the functionality of the mode transition modules 725 of devices 705 and/or 805 of FIG. 7 and/or FIG. 8.

In some embodiments, the mobile device 115-*d* includes network parameters module 715-*a* and direct transition evaluation module 720-*a*. Network parameters module 715-*a* may receive and store network parameters. For example, the network parameters module 715-*a* may receive various before-call network parameters via the PCH from a base station 105 while in the paging mode or as a part of a call setup procedure. The network parameters module 715-*a* may further, when in a traffic session, receive and store in-call network parameters associated with the TCH. While in the traffic session, network parameters module 715-*a* may receive in-call network parameters from several base stations 105 that may be part of an active set of base stations that may vary during the traffic session. Additionally or alternatively, network parameters module 715-*a* may store in-call network parameters as a part of a call release procedure. Exemplary before- and in-call network parameters include, but are not limited to, a SID/NID, band class, frequency, etc. When the traffic session ends, the direct transition evaluation module 720-*a* may determine whether it is safe for direct traffic session to paging mode transition based on the stored network parameters. The direct transition evaluation module 720-*a* may determine that it is safe for traffic session to paging mode transition without assistance from the network, e.g., without requiring the network to determine, package, and transmit additional paging channel information to the mobile device 115-*d*. According to certain aspects, the determination of safe transition is made based on comparing some or all of the before- and in-call network parameters using a hierarchical flow. For example, the determination may be made by following the hierarchical flow described above with reference to FIG. 6.

In some embodiments, the mobile device 115-*d* includes paging information module 820-*a*. The paging information module 820-*a* may be configured to receive current paging information and/or network parameters from one receiver of transceiver 910 while mobile device 115-*d* communicates in a traffic session using a second receiver of transceiver 910. The paging information module 820-*a* may maintain current paging information associated with a base station 105 while in the traffic session. Upon termination of the traffic session, the mode transition module 725-*b* may be configured to perform a direct transition from the traffic session to the paging mode. The mode transition module 725-*b* may perform the direct transition based on paging information from the paging information module 820-*a*. The direct transition may avoid traditional re-synchronization procedures such as pilot acquisition and sync message decoding The components of the devices 705 and/or 805, and/or the mobile device 115-*d* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the devices 705 and/or 805, and/or the mobile device 115-*d*.

Figure 10:
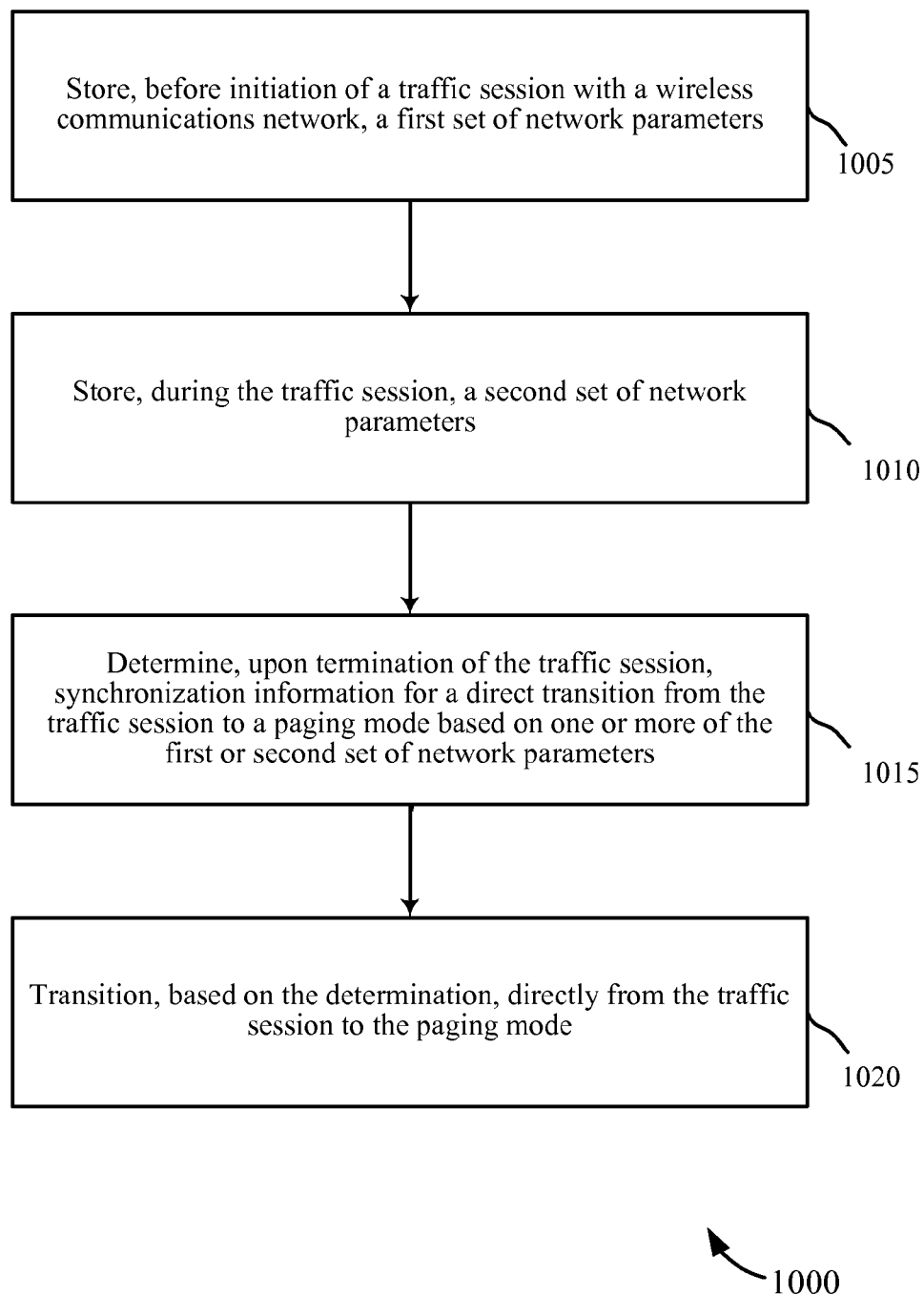
FIG. 10 is a flowchart of a method for fast traffic session to paging mode transition.

FIG. 10 is a flowchart of a method 1000 for safely transitioning from a traffic session to a paging mode in accordance with aspects of the present disclosure. The method 1000 may be performed by one or more of the devices 705 and/or 805 of FIG. 7 and/or FIG. 8, and/or the mobile devices 115 of FIGS. 1-4 and/or 9. Similarly, the method 1000 may implement aspects of the flows 300 and/or 400 and the processes 500 and/or 600. In one implementation, the processor module 925 of the mobile device 115-*d* of FIG. 9 may execute one or more sets of codes or computer executable instructions to control the functional elements of the mobile device 115-*d* to perform the functions described below. At block 1005, the method 1000 begins where a mobile device may store, before initiation of a traffic session with a wireless communications network, before-call network parameters (also referred to as a first set of network parameters). At block 1010, the mobile device may store, during the traffic session, in-call network parameters (also referred to as a second set of network parameters). Exemplary network parameters may include, but are not limited to, a SID/NID, a band class, a frequency, and an Active Set PN offset sequence.

At block 1015, the mobile device determines, upon termination of the traffic session, synchronization information for a direct transition from the traffic session to a paging mode. The synchronization information may be based on the stored network parameters. According to one implementation, the before-call and in-call network parameters are compared using a hierarchical flow. Accordingly, if certain of the before-call network parameters correspond to the in-call network parameters, the mobile device may determine it is safe for a direct traffic session to paging mode transition. In some aspects, the mobile device may determine it is safe to transition directly to the paging mode, upon termination of the traffic session, using a blind PCH scheme (e.g., using last known good paging information). If the synchronization information indicates that it is safe for direct transition, the method may continue to block 1020 where the mobile device transitions directly from the traffic session to the paging mode. For example, the mobile device may transition directly from communication over a TCH for the traffic session to receiving paging information via the PCH without performing pilot signal detection and acquisition and/or synchronization channel reception and decoding.

Figure 11:
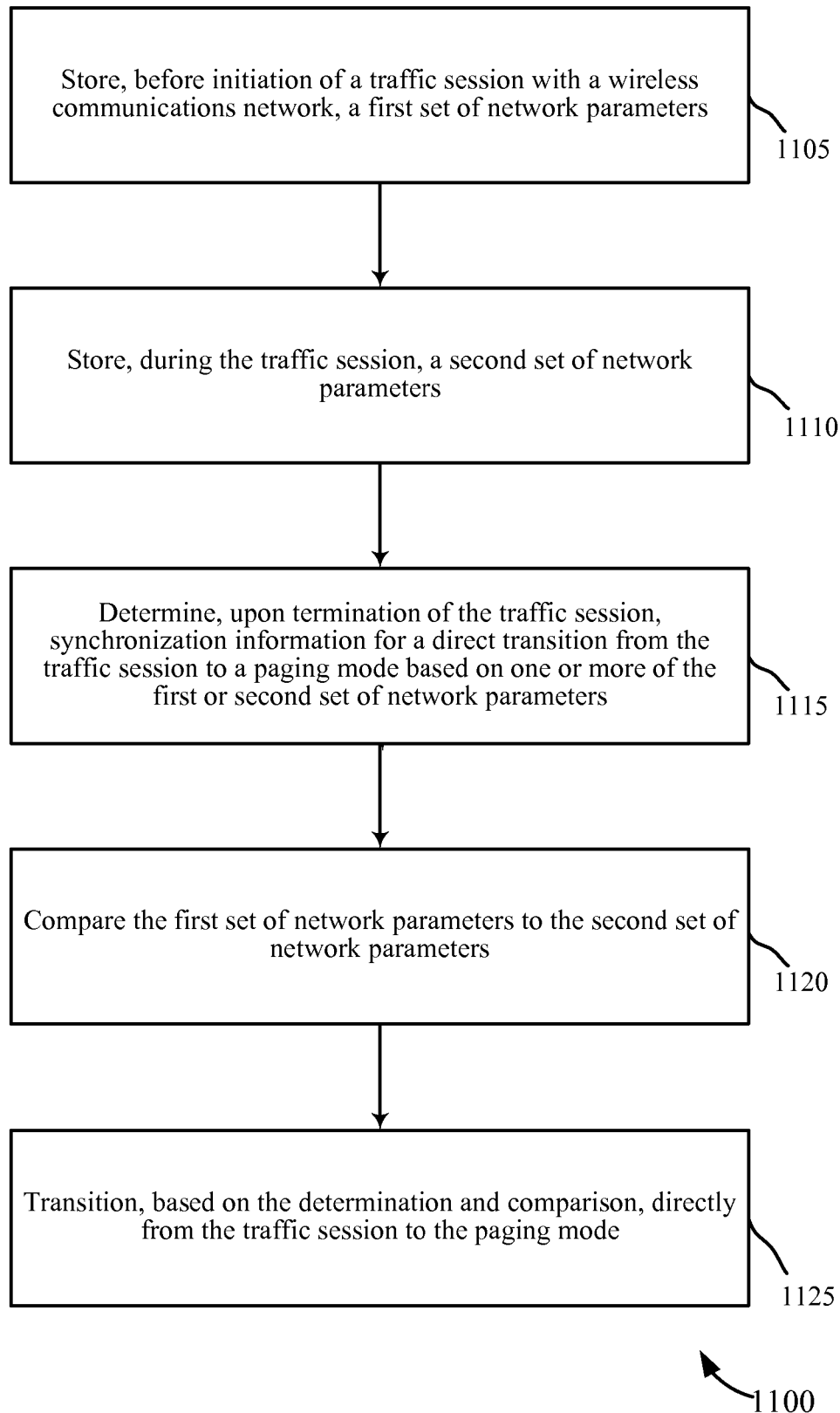
FIG. 11 is a flowchart of another method for fast traffic session to paging mode transition.

FIG. 11 is a flowchart of a method 1100 for safely transitioning from a traffic session to a paging mode in accordance with aspects of the present disclosure. The method 1100 may be performed by the devices 705 and/or 805 of FIG. 7 and/or FIG. 8, and/or the mobile devices 115 of FIGS. 1-4 and/or 9. Similarly, the method 1100 may implement aspects of the flows 300 and/or 400 and the processes 500 and/or 600. In one implementation, the processor module 925 of the mobile device 115-*d* of FIG. 9 may execute one or more sets of codes to control the functional elements of the mobile device 115-*d* to perform the functions described below. At block 1105, the method 1100 begins where a mobile device may store, before initiation of a traffic session with a wireless communications network, before-call network parameters. At block 1110, the mobile device may store, during the traffic session, in-call network parameters. At block 1115, the mobile device determines, upon termination of the traffic session, synchronization information. The synchronization information may be for a direct transition from the traffic session to a paging mode and be based on the stored network parameters.

According to some aspects, the mobile device compares, at block 1120, the before-call and in-call network parameters. Thus, the mobile device may determine whether the before-call network parameters associated with monitoring a paging channel are different than the in-call network parameters associated with communicating via the TCH. If the stored network parameters substantially correspond, the method 1100 may move to block 1125 where the mobile device may transition, based on the determination and comparison, directly from the traffic session to the paging mode where the PCH may be monitored for incoming paging information.

Figure 12:
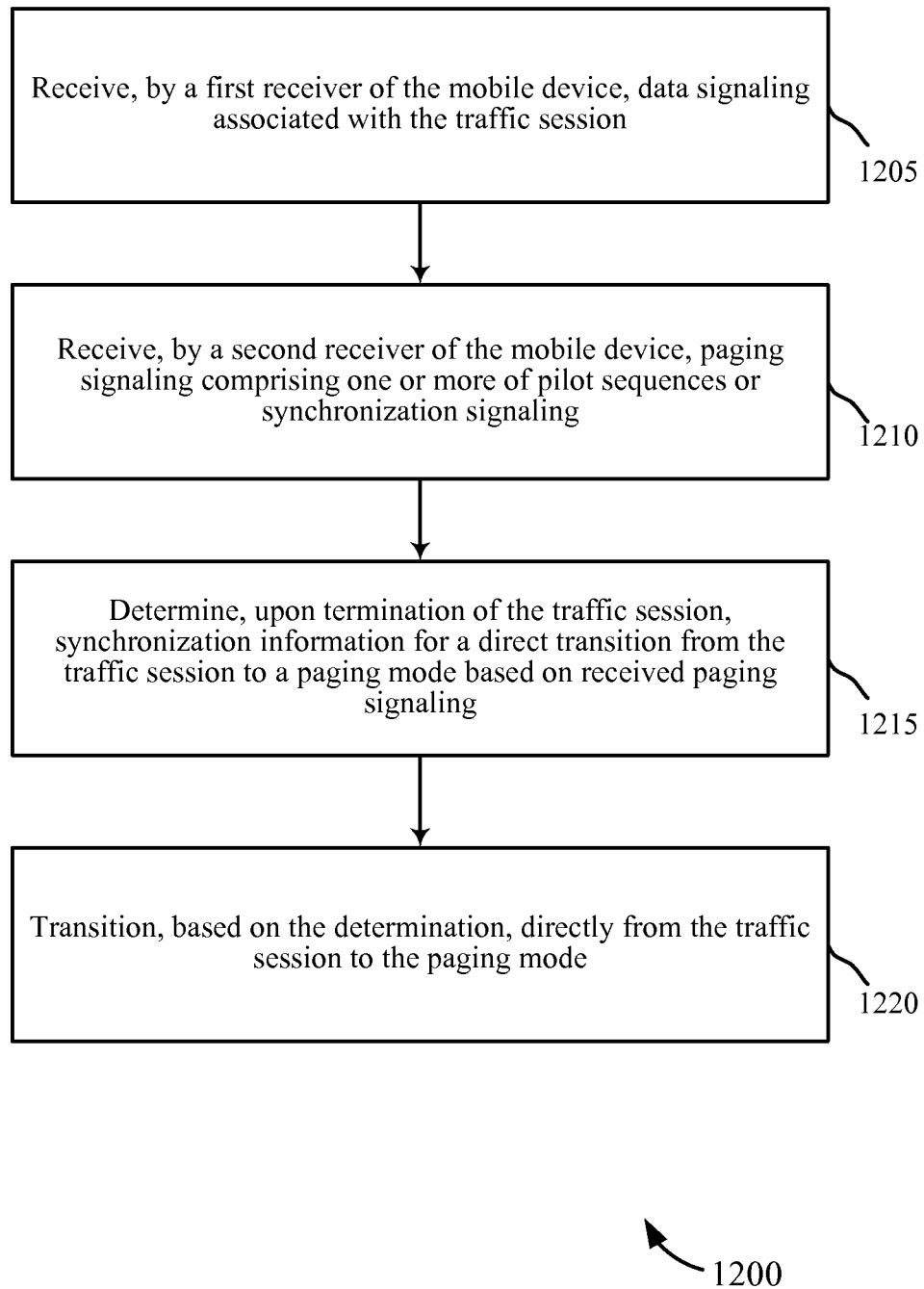
FIG. 12 is a flowchart of yet another method for fast traffic session to paging mode transition.

FIG. 12 is a flowchart of a method 1200 for safely transitioning from a traffic session to a paging mode. The method 1200 may be performed by the devices 705 and/or 805 of FIG. 7 and/or FIG. 8, and/or the mobile devices 115 of FIGS. 1-4 and/or 9. Similarly, the method 1200 may implement aspects of the flows 300 and/or 400 and the processes 500 and/or 600. In one implementation, the processor module 925 of the mobile device 115-*d* of FIG. 9 may execute one or more sets of codes to control the functional elements of the mobile device 115-*d* to perform the functions described below. At block 1205, the method 1200 begins where a mobile device may receive, by a first receiver of the mobile device, data signaling associated with a traffic session. At block 1210, the mobile device may receive, by a second receiver of the mobile device, paging signaling. The paging signaling may include one or more of pilot sequences or synchronization signaling. As such, the mobile device may always have the most current paging information associated with the PCH.

At block 1215, the mobile device may determine, upon termination of the traffic session, synchronization information for a direct transition from the traffic session to a paging mode. The synchronization information may be based on the received paging signaling from the second receiver. At block 1220, the mobile device may transition, based on the determination, directly from the traffic session to the paging mode where the PCH may be immediately monitored.

Figure 13:
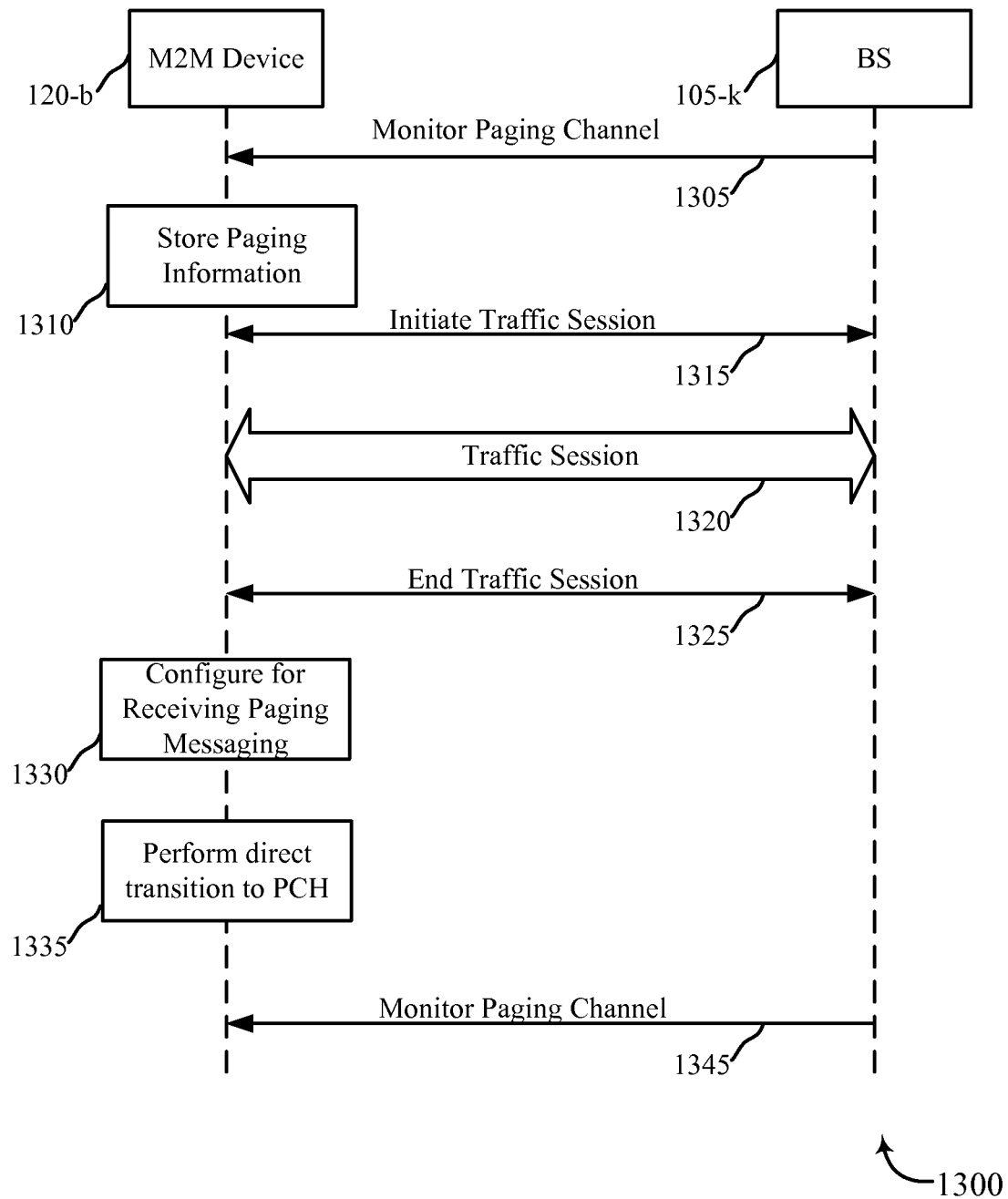
FIG. 13 is a diagram illustrating an exemplary communication flow between a M2M device and a base station.

Turning now to FIGS. 13-22, methods, systems, and devices configured for avoiding network re-synchronization procedures for stationary M2M devices are described. FIG. 13 is a diagram illustrating an exemplary communication flow 1300 for avoiding network re-synchronization procedures in stationary M2M devices. In communication flow 1300, the M2M device 120-*b* may be any of the M2M devices 120 of FIGS. 1-2. At 1305, the M2M device 120-*b* is in a sleep state where it monitors the PCH associated with base station 105-*k* to receive paging and/or overhead information. At 1310, the M2M device 120-*b* stores the paging information. The paging information may be associated with the base station 105-*k* (e.g., paging channel rate, a paging slot cycle, etc.). At 1315, a traffic session is initiated between the M2M device 120-*b* and the base station 105-*k*. The traffic session may be initiated by the M2M device 120-*b* or by the base station 105-*k*.

At 1320, the M2M device 120-*b* and the base station 105-*k* exchange information via the TCH, as determined by the traffic session. The traffic session ends at 1325. At 1330, the M2M device 120-*b* is configured for receiving paging messaging. The M2M device 120-*b* may be configured to receive the paging messaging based on the paging information stored at 1310. According to certain aspects, the M2M device 120-*b* configures certain hardware elements to receive the paging messaging from the base station 105-*k*, e.g., configures hardware elements to monitor and receive paging information via the PCH of base station 105-*k*. At 1335, the M2M device 120-*b* performs direct transition to the paging mode where the paging channel is monitored at 1345.

Figure 14:
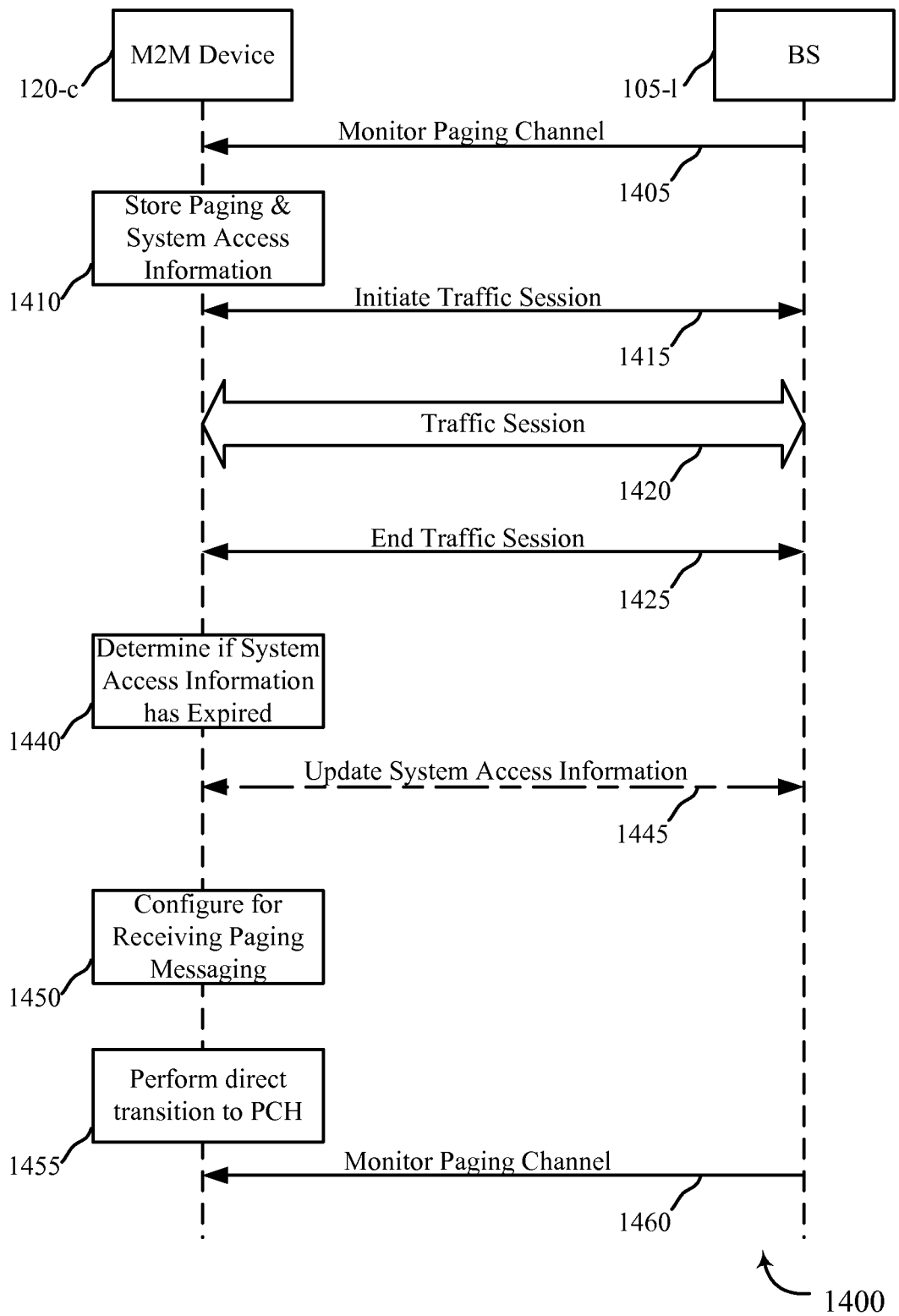
FIG. 14 is a diagram illustrating another exemplary communication flow between a M2M device and a base station.

FIG. 14 is a diagram illustrating a communication flow 1400 between a M2M device 120-*c* and a base station 105-1, the M2M device 120-*c* configured for avoiding network re-synchronization procedures when a traffic session has ended. At 1405, the M2M device 120-*c* is in a sleep state where it monitors the PCH associated with the base station 105-1 to receive paging and/or system access (e.g., overhead) information. At 1410, the M2M device 120-*c* stores the paging information and the system access information. Exemplary paging information associated with the base station 105-1 includes, but is not limited to, a paging channel rate, a paging slot cycle, etc. System access information includes various network parameters associated with communicating with base station 105-1, e.g., network overhead information. At 1415, a traffic session is initiated between the M2M device 120-*c* and the base station 105-1. The traffic session may be initiated by the M2M device 120-*c* or by the base station 105-1.

At 1420, the M2M device 120-*c* and the base station 105-1 exchange data and/or information via the TCH, as determined by the traffic session. The traffic session ends at 1425. At 1440, the M2M device 120-*c* determines if the system access information has expired. According to certain aspects, the system access information is stored for a defined time period. Accordingly, an overhead timer may be initiated when the M2M device 120-*c* first stores the system access information at 1410. The M2M device 120-*c* may determine whether the system access information has expired by determining whether the associated overhead timer has completed its cycle. If the system access information has expired at 1440, the method moves to 1445 and the M2M device receives one or more access configuration messages from the base station 105-1 to update the stored system access information. The M2M device 120-*c* updates the system access information stored at 1410 with the system access information received at 1445 and may reset the overhead timer. M2M device 120-*c* may be configured for receiving paging messaging at 1450. The M2M device 120-*c* may be configured to receive the paging messaging based on the paging information stored at 1410. According to certain aspects, the M2M device 120-*c* configures certain hardware elements to receive the paging messaging from the base station 105-1, e.g., configures hardware elements to monitor and receive paging information via the PCH of base station 105-1. At 1455, the M2M device 120-c may perform a direct transition to the paging mode where the paging channel is monitored at 1460.

Figure 15:
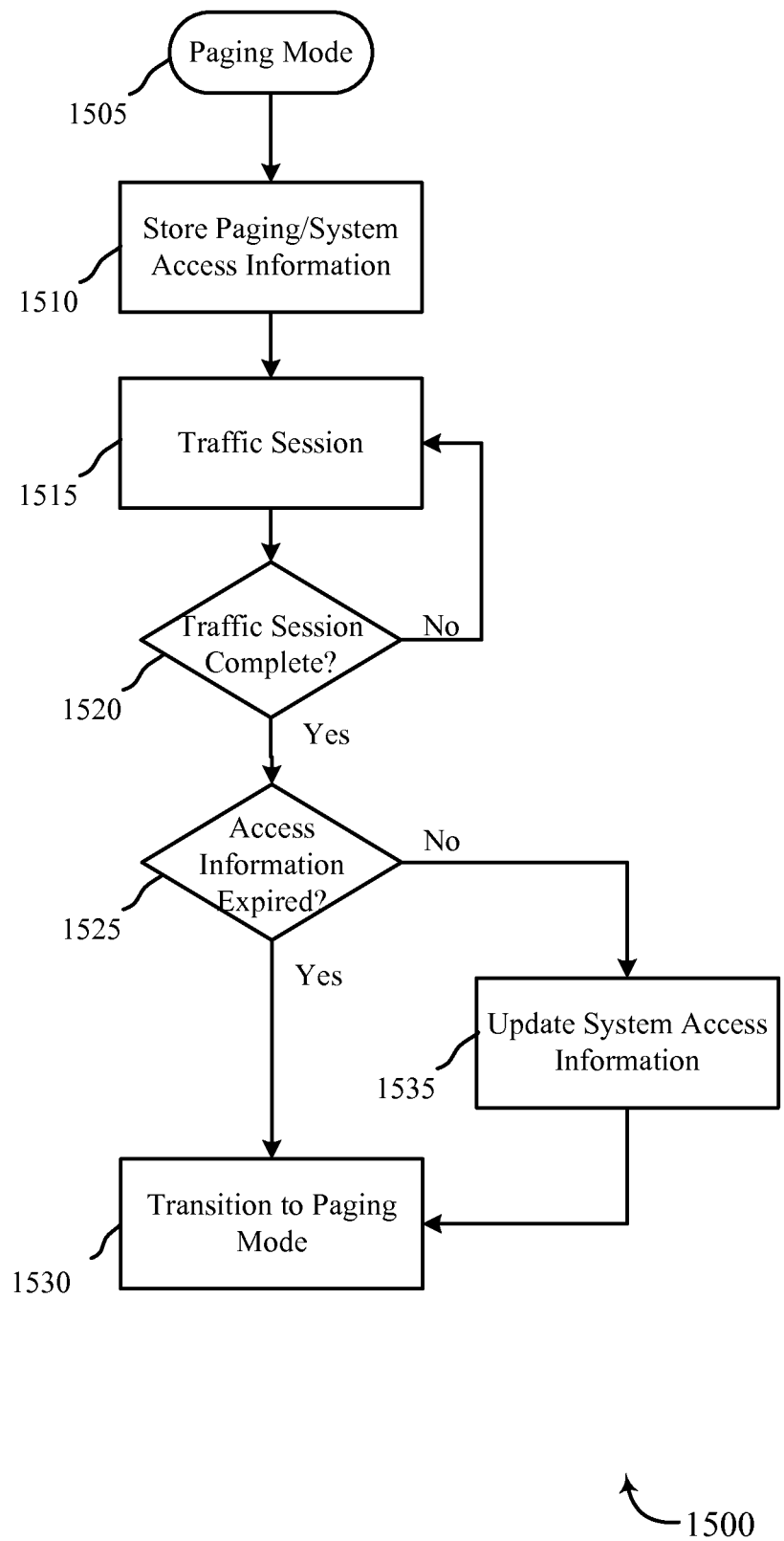
FIG. 15 is a process diagram illustrating transition from a traffic session to a paging mode in a M2M device.

FIG. 15 is a diagram illustrating a process 1500 for avoiding network re-synchronization procedures by transitioning from a traffic session to a paging mode in a stationary M2M device. The process 1500 may implement, for example, aspects of wireless communications system 100 or 200, as well as the communication flows 1300 and 1400. At 1505, the process 1500 begins with a M2M device in a paging mode. The M2M device may be registered with a base station and monitoring the PCH of the base station. The M2M device stores paging information and system access information at block 1510. The paging information may be received via the PCH of the base station. System access information may include information indicative of the network parameters associated with a TCH of the base station. At 1515, a traffic session is initiated. The traffic session may be initiated by the M2M device or the base station. At 1520, the M2M device determines if the traffic session is complete. If not, the M2M device loops back to 1515 to continue the traffic session. If the traffic session is complete, the process moves to 1525 where the M2M device determines if the system access information has expired. In accordance with certain aspects, the system access information may expire after a defined time period.

In one example, an overhead timer may be associated with the system access information and initiated when the information is stored. Accordingly, the M2M device may determine if the overhead timer has competed its cycle at 1525 to determine if the system access information has expired. If the system access information has expired, the process moves to 1535 where the M2M device validates and, if necessary, updates the system access information. The system access information may be updated by receiving one or more access configuration messages from the base station. The stored system access information may be updated to reflect the newly received system access information. If the system access information has not expired, the process moves to 1530 where the M2M device transitions directly to the paging mode, thus avoiding network re-synchronization procedures. The M2M device may be configured to receive paging messaging based on the paging information stored at 1510. For example, elements of the M2M device (hardware, software, firmware, etc.) may be configured to synchronize and decode the PCH from a base station based on the paging information.

Figure 16:
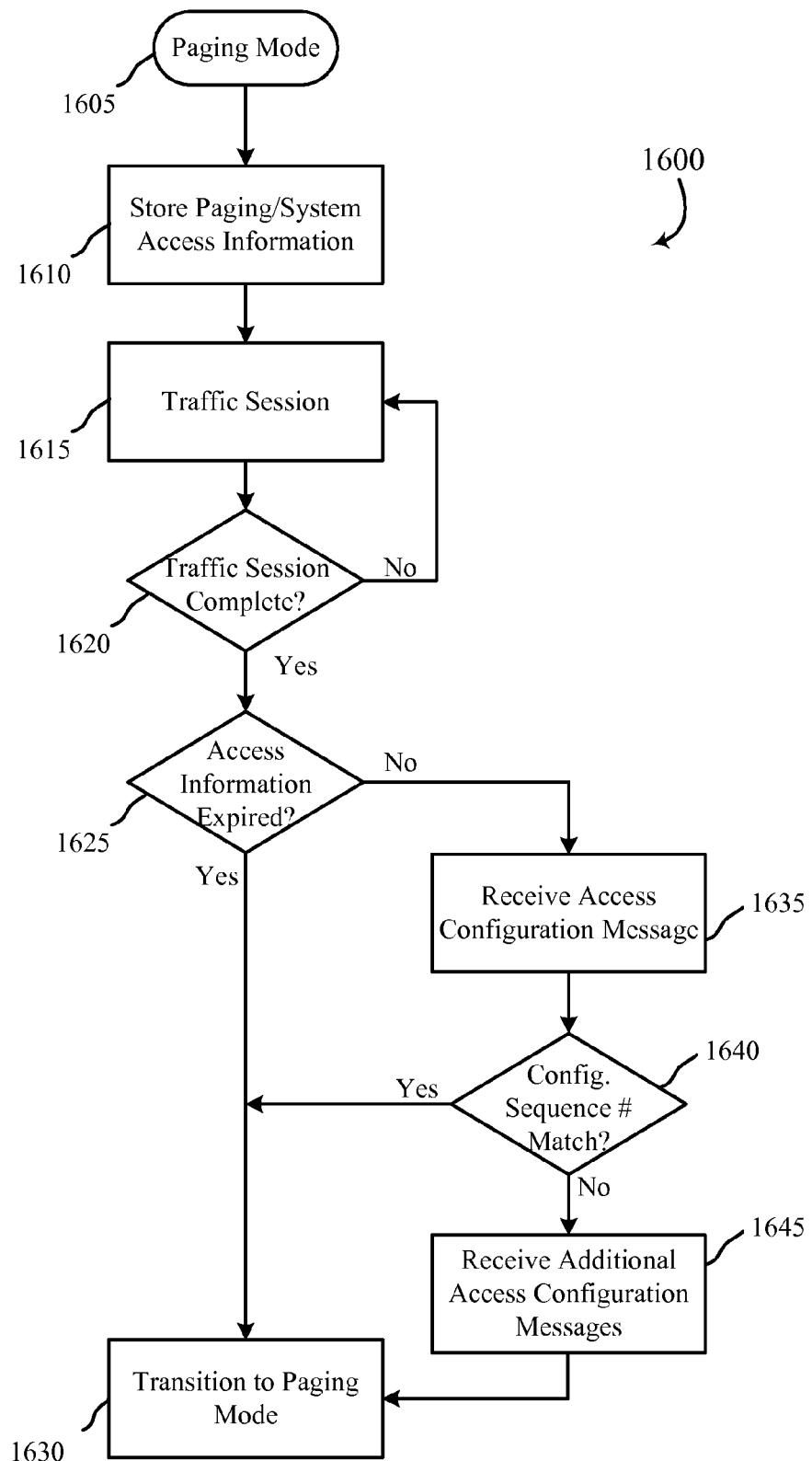
FIG. 16 is another process diagram illustrating transition from a traffic session to a paging mode in a M2M device.

FIG. 16 is a diagram illustrating a process 1600 for avoiding network re-synchronization procedures in a stationary M2M device by transitioning from a traffic mode to a paging mode. The process 1600 may implement, for example, aspects of wireless communications networks 100 or 200, as well as the communication flows 1300 or 1400. At 1605, the process 1600 starts with the M2M device in a paging mode. The M2M device may be registered with a base station and monitoring the PCH of the base station for paging information and/or system access information. The M2M device stores the paging information and system access information at 1610. The paging information may include various network parameters associated with the PCH while system access information may include information associated with communicating over a TCH of the base station. At 1615, a traffic session is initiated. The traffic session may be initiated by the M2M device or the base station. At 1620, the M2M device determines if the traffic session is complete. If not, the process loops back to 1615 to continue the traffic session.

If the traffic session is complete, the process moves to 1625 where the M2M device determines if the system access information has expired. In accordance with certain aspects, expiration of the system access information may be based on an overhead timer associated with the system access information. If the system access information has expired, the process moves to 1635 where the M2M device may validate the system access information by receiving one or more access configuration messages. The access configuration messages may include a configuration sequence number that may be used by the M2M device (e.g., using a look-up table) to determine various network parameters associated with the base station. At 1640, the M2M device determines if a configuration sequence number in the access configuration message matches a corresponding configuration sequence number associated with the system access information stored at 1610. If the configuration sequence numbers match, it may indicate that the network parameters associated with the stored system access information are still valid (e.g., has not changed). Accordingly, the process may move to 1630 where the M2M device avoids network re-synchronization procedures by transitioning directly to the paging mode. If the configuration sequence numbers match (i.e., the stored system access information is valid), the M2M device may avoid or disable reception of one ore more subsequent access configuration messages. If, however, the configuration sequence numbers do not match, the process moves to 1645 where the M2M device receives and decodes additional access configuration messages. The M2M device utilizes information in the access configuration messages to update the stored system access information at 1645 before moving to 1630 and transitioning to the paging mode.

Figure 17:
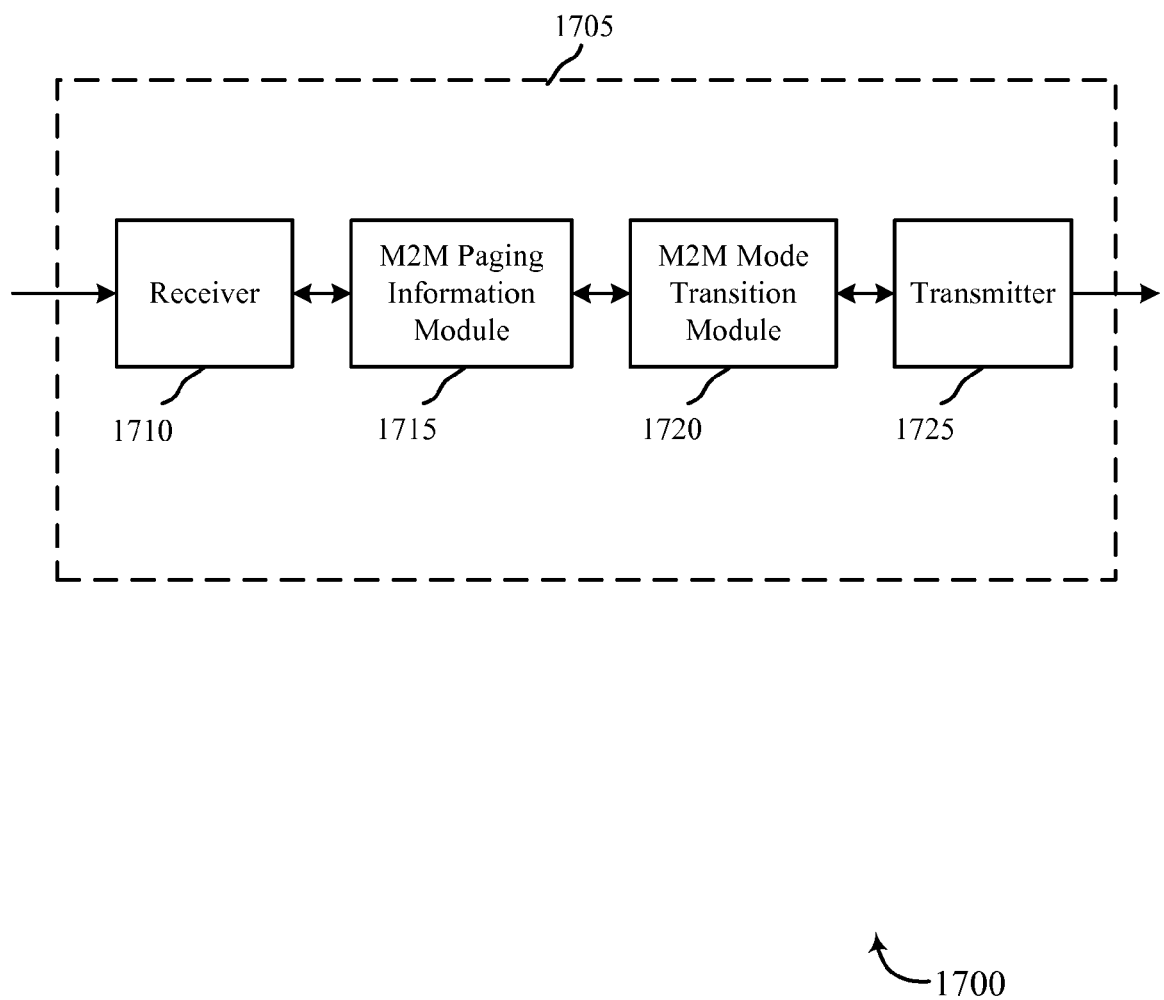
FIG. 17 is a block diagram of a device.

FIG. 17 is a block diagram 1700 of a device 1705 for avoiding network re-synchronization in stationary M2M devices in accordance with various embodiments. The device 1705 may implement aspects and/or components of the M2M devices 120 of FIGS. 1-2 and/or 13-14, as well as implementing aspects of flows 1300 and/or 1400 and processes 1500 and/or 1600. In one embodiment, functionality of the stationary device 1705 may be implemented as one or more components of the M2M device 120-d (e.g., the processor module 1970, the M2M paging information module 1715-b, the M2M mode transition module 1720-b, etc.) of FIG. 19. Device 1705 includes a receiver 1710, M2M paging information module 1715, M2M mode transition module 1720, and a transmitter 1725. These modules may be in communication, directly or indirectly, with each other.

In embodiments, the device 1705 is a stationary device and configured to avoid network re-synchronization procedures by transitioning from a traffic session directly to a paging mode once the traffic session is complete. Before initiation of the traffic session, the receiver 1710 may monitor a PCH of a base station 105. M2M paging information module 1715 may store paging information associated with monitoring the PCH of the base station 105 (e.g., paging channel frequency, paging channel rate, paging slot cycle, etc.). The device 1705 may communicate data and information with the base station 105 on a traffic session (e.g., via receiver 1710 and/or transmitter 1725). Upon termination of the traffic session, the M2M paging information module 1715 may communicate the paging information to the transition module 1720. The transition module 1720 receives the paging information and may configure relevant hardware elements of the device 1705 (e.g., receiver 1710 and/or transmitter 1725, etc.) for a direct transition from the traffic session to the paging mode based on the paging information. The device 1705, in transitioning directly from the traffic session to the sleep state, may avoid traditional network re-synchronization procedures such as pilot signal detection and decoding of synchronization signals and/or channels.

Figure 18:
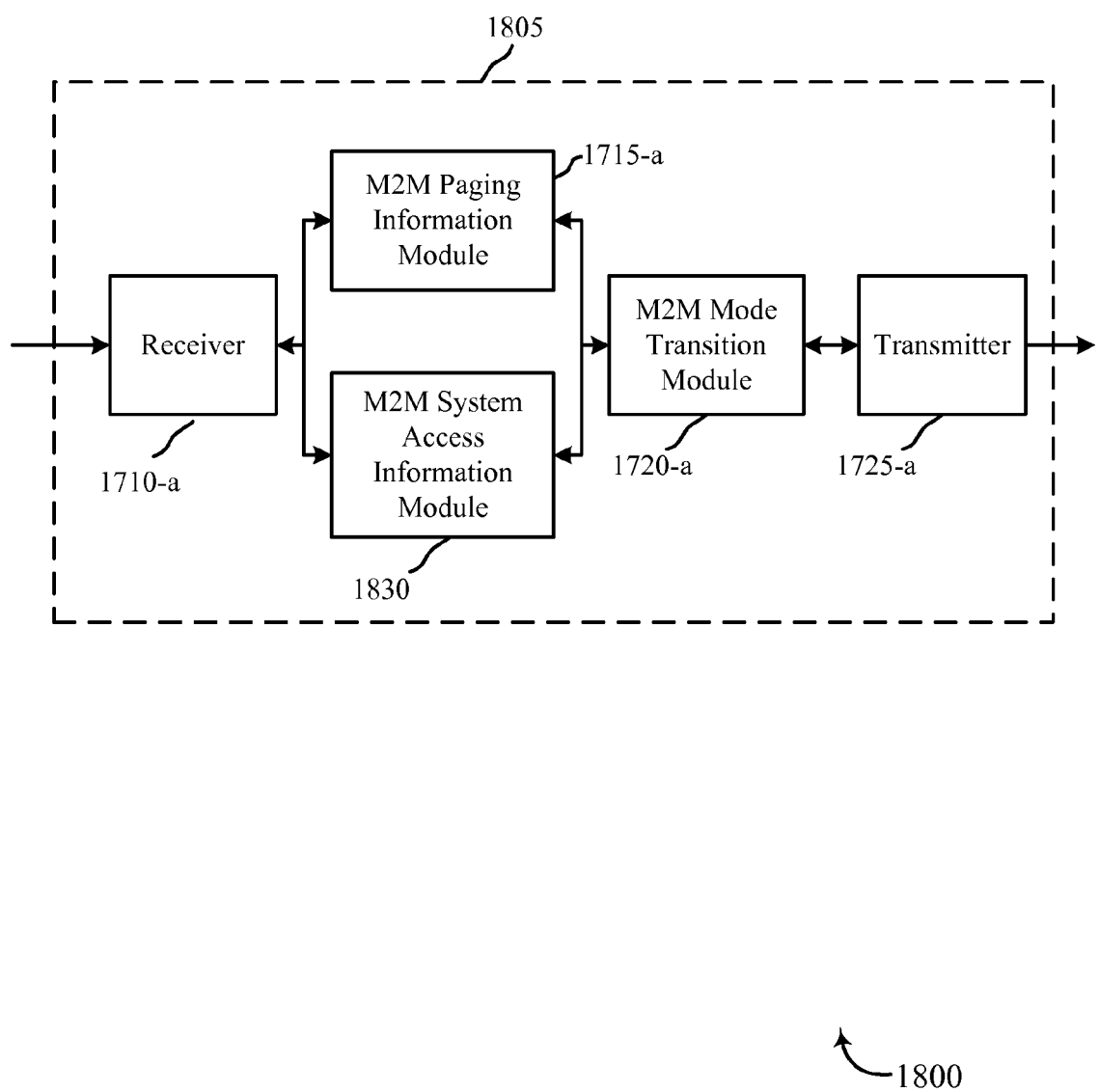
FIG. 18 is a block diagram of another device.

FIG. 18 is a block diagram 1800 of another exemplary device 1805 for avoiding network re-synchronization in stationary M2M devices in accordance with various embodiments. The device 1805 may implement aspects and/or components of the M2M devices 120 of FIGS. 1-2 and 13-14, and/or aspects of the device 1705 of FIG. 17, as well as implementing aspects of flows 1300 and/or 1400 and/or processes 1500 and/or 1600. In one embodiment, functionality of the stationary device 1805 may be implemented as one or more components of the M2M device 120-*d* (e.g., the processor module 1970, the M2M paging information module 1715-*b*, the M2M system access information module 1830-*a*, the M2M mode transition module 1720-*b*, etc.) of FIG. 19. Device 1805 includes a receiver 1710-*a*, M2M paging information module 1715-*a*, M2M mode transition module 1720-*a*, a transmitter 1725-*a*, and M2M system access information module 1830. These modules may be in communication, directly or indirectly, with each other.

The M2M paging information module 1715-*a* is configured to receive and store paging information for monitoring the PCH of a base station 105. For example, the M2M paging information module 1715-*a* may perform the functions of the M2M paging information module 1715 illustrated in FIG. 17. The M2M system access information module 1830 is configured to receive and store system access information before initiation of a traffic session. The system access information may include various network parameters associated with communicating with the base station 105. For example, the system access information may include parameters for accessing the network via an Access Channel (e.g., preamble size, maximum size, etc.). The M2M paging information module 1715-*a* may communicate the paging information to the M2M mode transition module 1720-*a*. In accordance with certain aspects, the M2M mode transition module 1720-*a* receives the paging information and, upon termination of a traffic session, may configure the relevant hardware elements of the device 1805 (e.g., receiver 1710-*a*, transmitter 1725-*a*, etc.) for a direct transition from the traffic session to the paging mode.

According to other aspects, the M2M system access information module 1830 is configured to determine if the system access information remains valid or is expired before direct transition from the traffic session to the paging mode. The M2M system access information module 1830 may include an overhead timer associated with the stored system access information. The stored system access information may be known to be valid until at least expiration of the overhead timer. Upon termination of the traffic session, the M2M system access information module 1830 may determine whether the stored system access information has expired. If the stored system access information has expired, the M2M system access information module 1830 may validate the stored system access information by receiving one or more access configuration messages and confirming whether a configuration sequence number of the stored system access information matches a configuration sequence number associated with the one or more access configuration messages. If the configuration sequence numbers match (i.e., the stored system access information is valid), the M2M system access information module 1830 may avoid or disable reception (e.g., disable receiver 1710-*a*, etc.) of one ore more subsequent access configuration messages. If the configuration sequence numbers do not match, the M2M system access information module 1830 may receive and decode additional access configuration messages (e.g., enable transmitter 1725-*a*) to update the stored system access information.

Figure 19:
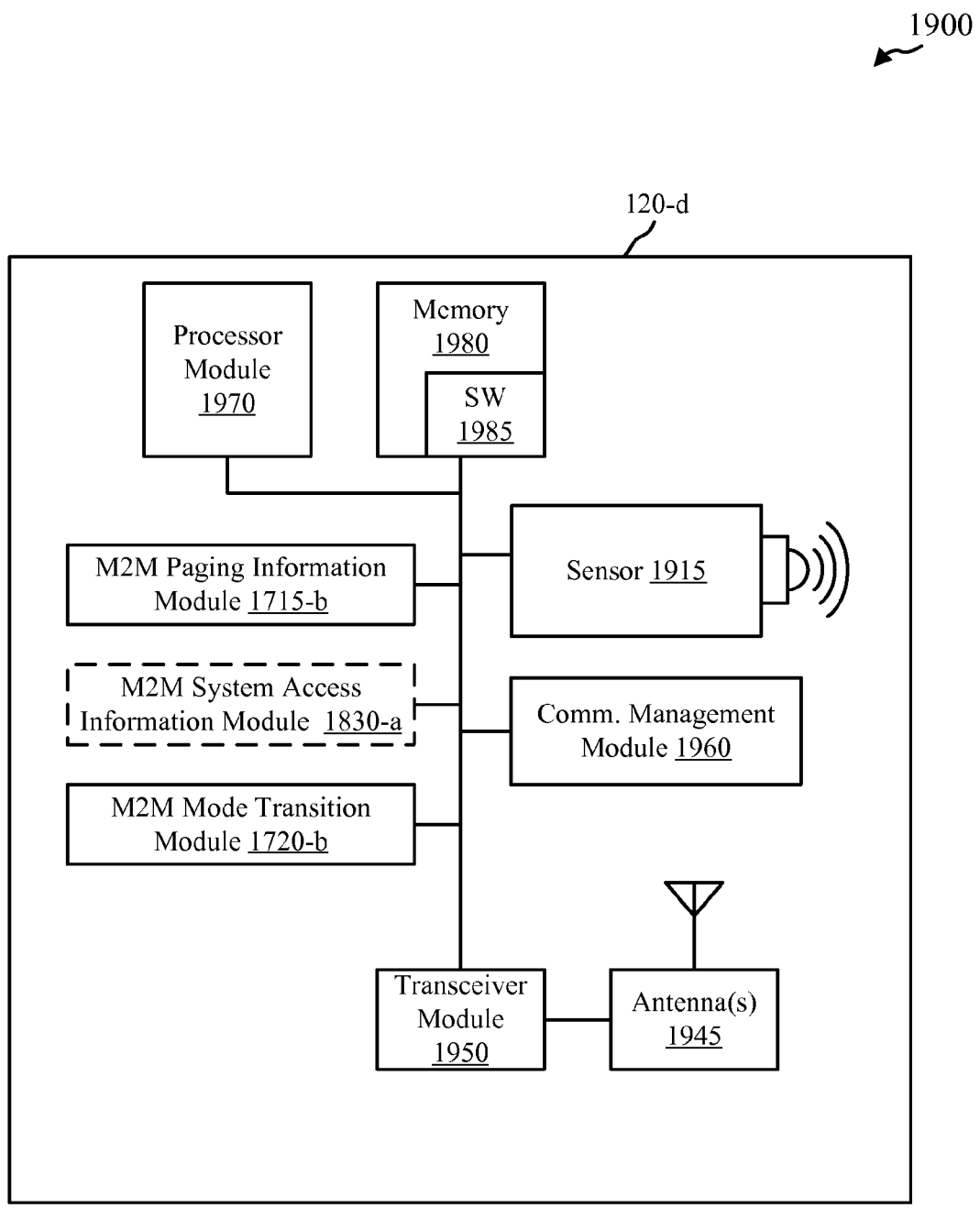
FIG. 19 is a block diagram of an example of a M2M device.

FIG. 19 is a block diagram 1900 of a M2M device 120-*d* configured for avoiding network re-synchronization procedures. The M2M device 120-*d* may illustrate, for example, aspects of the M2M devices 120 of FIGS. 1-2 and/or 13-14, and/or aspects of the devices 1705 and/or 1805 of FIGS. 17 and/or 18. The M2M device 120-*d* may also implement aspects of the flows 1300 and/or 1400 and/or the processes 1500 and/or 1600. In embodiments, functionality of the devices 1705 and/or 1805 may be implemented as one or more components of the M2M device 120-*d* (e.g., the processor module 1970, the M2M paging information module 1715-*b*, the M2M mode transition module 1720-*b*, the M2M system access information module 1830-*a*, etc.). The M2M device 120-*d* may have any of various configurations, such as a sensor or monitor for various applications. The M2M device 120-*d* may have an internal power supply (not shown), such as a small battery, to facilitate field operation.

The M2M device 120-*d* may include sensor 1915, antenna(s) 1945, a transceiver module 1950, a memory 1980, M2M paging information module 1715-*b*, M2M mode transition module 1720-*b*, M2M system access information module 1830-*a*, and a processor module 1970, which each may be in communication, directly or indirectly, with each other (e.g., via one or more buses). The sensor 1915 may monitor or track other devices, environmental conditions, etc., and provide information indicative of the gathered data. The transceiver module 1950 may be configured to communicate bi-directionally, via the antenna(s) 1945 and/or one or more wired or wireless links, with one or more networks, as described above. For example, the transceiver module 1950 may be configured to communicate bi-directionally with the base station 105 of FIG. 1.

The memory 1980 may include RAM and ROM. The memory 1980 may store computer-readable, computer-executable software code 1985 containing instructions that are configured to, when executed, cause the processor module 1970 to perform various functions described herein (e.g., store paging information, communicate during the traffic session, transition back to the paging mode, etc.). Alternatively, the software code 1985 may not be directly executable by the processor module 1970 but be configured to cause a computer (e.g., when compiled and executed) to perform functions described herein. The processor module 1970 may include an intelligent hardware device, e.g., a CPU, a microcontroller, an ASIC, etc.

The M2M device 120-*d* may be stationary and configured to avoid network re-synchronization procedures by transitioning from a traffic session directly to a paging mode once the traffic session is complete. Before initiation of the traffic session, the M2M paging information module 1715-*b* may store paging information associated with a monitored PCH of a base station 105. Once the traffic session is complete, M2M mode transition module 1720-*b* may configure the relevant hardware elements of the M2M device 120-*d* (e.g., transceiver module 1950, etc.) for a direct transition from a traffic session to a paging mode based on paging information stored by the M2M paging information module 1715-*b*. In some embodiments, the M2M mode transition module 1720-*b* may include hardware, code, instructions, etc., configured to control transition between an active state where the M2M device 120-*d* is in a traffic session and the paging mode. The M2M device 120-*d* may, while in the paging mode, put various modules (e.g., sensor 1915, transceiver module 1950, etc.) in a low-power (or zero-power) state. Thus, the paging mode may correspond to a sleep or IDLE state of the M2M device 120-*d*. While in the paging mode, components necessary for reception of paging (e.g., transceiver 1950, etc.) may be enabled for short time periods to receive paging messaging (e.g., according to the paging slot cycle, etc.).

According to other aspects, the M2M system access information module 1830-*a* may store system access information before transitioning to the traffic session. The system access information may include various network parameters associated with communicating with a base station. An overhead timer may be associated with the system access information and may indicate whether the system access information is current. The M2M device 120-*d* may, upon termination of a traffic session, determine whether the system access information has expired based on the overhead timer. If the system access information has expired, the M2M device 120-*d* may validate the system access information, and, if necessary, update the system access information by receiving access configuration messages from the base station. Once the system access information is confirmed valid (or updated), the M2M device 120-*d* may return to the sleep state.

The M2M device 120-*d* may further include a communications management module 1960. The communications management module 1960 may manage communications with base stations 105 and/or other M2M devices 120. By way of example, the communications management module 1960, the M2M paging information module 1715-*b*, the M2M mode transition module 1720-*b*, and/or the M2M system access information module 1830-*a* may be components of the M2M device 120-*d* in communication with some or all of the other components of the M2M device 120-*d* via a bus. Alternatively, functionality of these modules may be implemented as components of the transceiver module 1950, as a computer program product, and/or as one or more controller elements of the processor module 1970.

The components of the devices 1705 and/or 1805, and/or the M2M device 120-*d* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the devices 1705 and/or 1805, and/or the M2M device 120-*d*.

Figure 20:
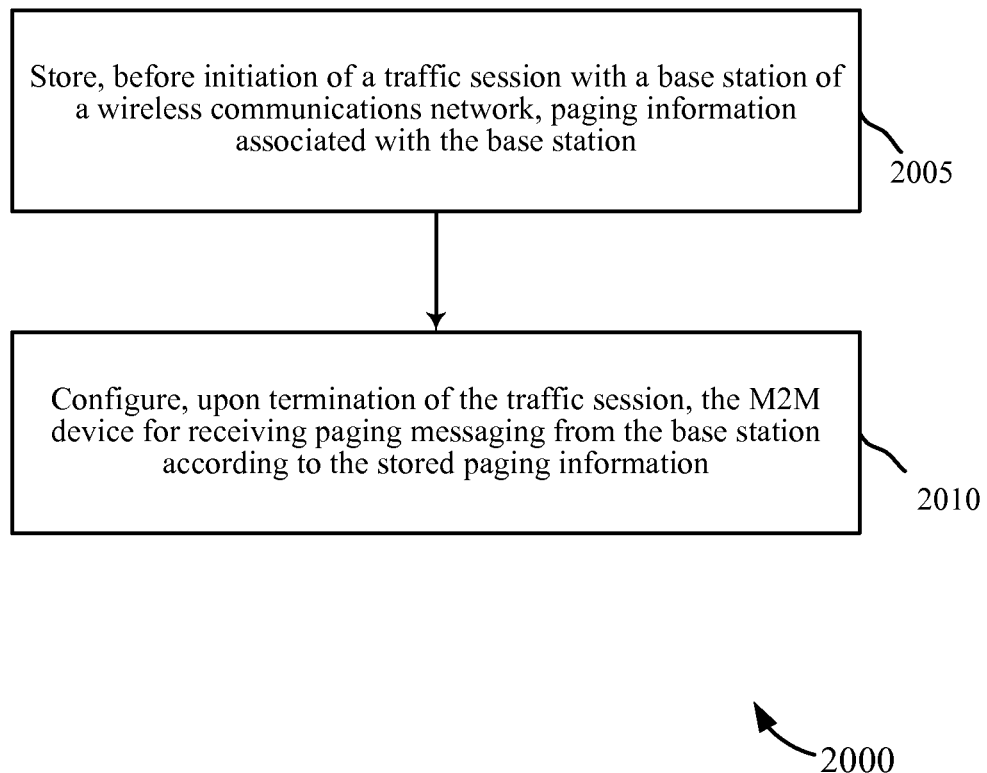
FIG. 20 is flowchart of a method to transition from a traffic session to a paging mode in a M2M device.

FIG. 20 is a flowchart of a method 2000 to transition from a traffic session to a paging mode in a M2M device. The method 2000 may be performed by the M2M devices 120 of FIGS. 1-2 and 13-14, and implements aspects of the flows 1300 or 1400 and the processes 1500 and 1600. In one implementation, the processor module 1970 of the M2M device 120-*d* may execute one or more sets of codes to control the functional elements of the device 120-*d* to perform the functions described below. At block 2005, the method 2000 begins where a M2M device may store, before initiation of a traffic session with a base station of the wireless communications network, paging information associated with the base station. The paging information may include information for monitoring the PCH of the base station. At block 2010, the M2M device, once the traffic session is complete, is configured for receiving paging messaging from the base station according to the stored paging information. As such, the method permits the M2M device to avoid traditional network re-synchronization procedures and directly transition to the sleep state or paging mode.

Figure 21:
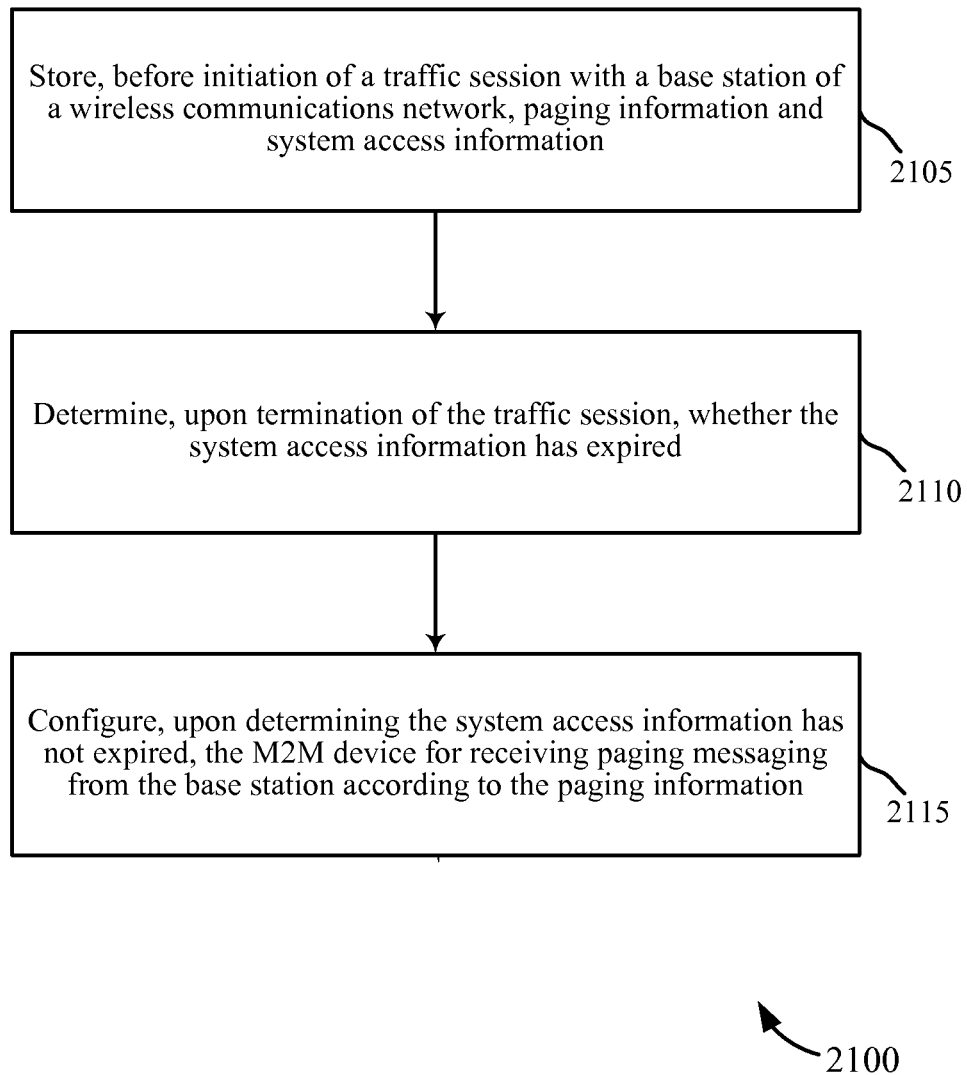
FIG. 21 is a flowchart on another method to transition from a traffic session to a paging mode in a M2M device.

FIG. 21 is a method 2100 for a M2M device to transition from a traffic session to a paging mode. The method 2100 may be performed by the M2M devices 120 of FIGS. 1-2 and 13-14. In embodiments, the method 2100 implements aspects of the flows 1300 or 1400 and the processes 1500 and 1600. In one implementation, the processor module 1970 of the M2M device 120-*d* may execute one or more sets of codes to control the functional elements of the device 120-*d* to perform the functions described below. At block 2105, the method 2000 begins where a M2M device may store, before initiation of a traffic session with a base station of the wireless communications network, paging information and system access information. The paging information and system access information may be associated with the base station. The paging information may include information for monitoring the PCH of the base station. The system access information may include information indicative of various network parameters associated with the base station (e.g., network overhead parameters associated with communication with the base station).

At block 2110, the M2M device determines, once the traffic session is complete, whether the system access information has expired. According to certain aspects, an overhead timer is initiated when the system access information is stored. When the timer completes its cycle, the system access information may be considered to have expired (e.g., in need of updating). If the system access information has not expired, the process moves to block 2115 where the M2M device is configured for a direct transition from the traffic session to a paging mode based on the stored paging information. As such, the method may permit the M2M device to avoid traditional network re-synchronization procedures upon termination of the traffic session.

Figure 22:
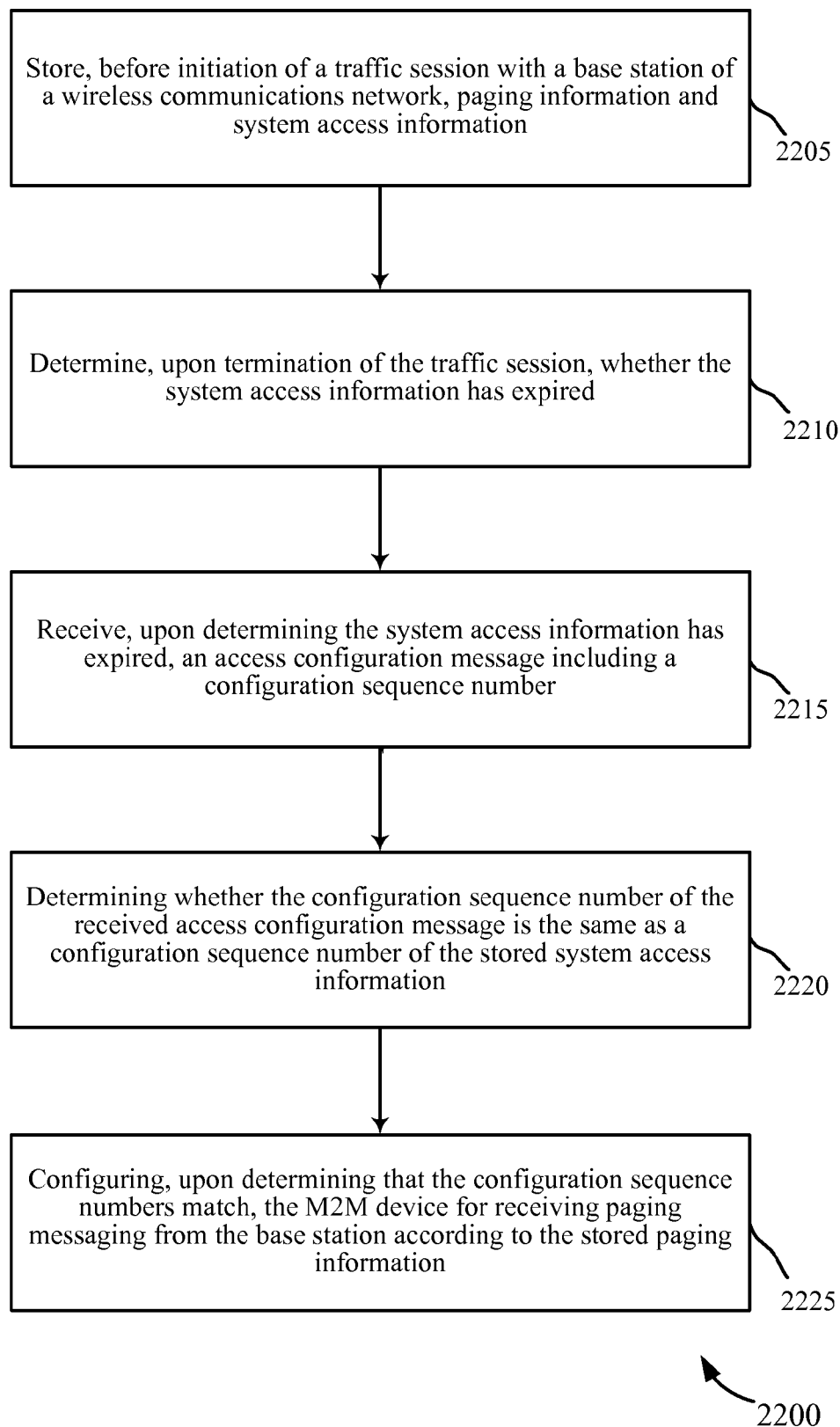
FIG. 22 is a flowchart of yet another method to transition from a traffic session to a paging mode in a M2M device.

FIG. 22 is a flowchart of a method 2200 for a M2M device to transition from a traffic session to a paging mode. The method 2200 may be performed by the M2M devices 120 of FIGS. 1-2 and 13-14. In embodiments, the method 2200 implements aspects of the flows 1300 or 1400 and the processes 1500 and 1600. In one implementation, the processor module 1970 of the M2M device 120-*d* may execute one or more sets of codes to control the functional elements of the device 120-*d* to perform the functions described below. At block 2205, the method 2200 begins where a M2M device may store, before initiation of a traffic session with a base station of the wireless communications network, paging information and system access information. The paging information and system access information may be associated with the base station. The paging information may include information for monitoring the PCH of the base station. The system access information may include information indicative of various network parameters associated with the base station (e.g., network overhead parameters associated with communication with the base station).

At block 2210, the M2M device determines, once the traffic session is complete, whether the system access information has expired. According to certain aspects, an overhead timer is initiated when the system access information is stored. When the timer completes its cycle, the system access information may be considered to have expired (e.g., in need of validating and, if necessary, updating). If the system access information has expired, the process moves to block 2215 where the M2M device begins the process of validating and, if necessary, updating the system access information. Validating and/or updating the system access information may be based on a configuration sequence number received in one or more access configuration messages. The configuration sequence number may be utilized by the M2M device to determine network parameters associated with the base station. In some aspects, the M2M device accesses a look-up table utilizing the configuration sequence number to determine the network parameters associated with the base station. At block 2220, the M2M device determines whether the configuration sequence number of a received access configuration message is the same as a corresponding configuration sequence number of the stored system access information. At block 2220, the M2M device may determine whether the configuration sequence number received in the access configuration message is the same as the configuration sequence number previously received. If the configuration sequence numbers match, the system access information may be considered valid and the process moves to block 2225 where the M2M device is configured for receiving paging messaging from the base station according to the stored paging information. As such, the method permits the M2M device to avoid traditional network re-synchronization procedures and also to avoid receiving unnecessary overhead messaging associated with updating the stored system access information when the system access information has not changed. Therefore, the M2M device may return to the sleep mode where the PCH is monitored more quickly and may further conserve power.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication performed by a mobile device, the method comprising:
   storing, before initiation of a traffic session with a wireless communications network, a first set of network parameters, wherein the first set of network parameters comprises a paging channel rate;
   storing, during the traffic session, a second set of network parameters;
   comparing the first set of network parameters to the second set of network parameters upon termination of the traffic session;
   determining, based on the comparing, that the first and second set of network parameters correspond to each other;
   transitioning, based on the determination, directly from the traffic session to a paging mode; and
   decoding, upon transitioning to the paging mode, paging signaling utilizing the paging channel rate.

2. The method of claim 1, further comprising:
   receiving, by a first receiver of the mobile device, data signaling associated with the traffic session; and
   receiving, by a second receiver of the mobile device, paging signaling comprising one or more of pilot sequences or synchronization signaling.

3. The method of claim 1, wherein the transitioning comprises:
   transitioning from the traffic session to the paging mode without performing one or more of pilot acquisition or synchronization signal decoding.

4. The method of claim 1, further comprising:
   receiving, before initiation of the traffic session, the first set of network parameters from the wireless communications network over a paging channel; and
   receiving, during the traffic session, the second set of network parameters' from the wireless communications network over a traffic channel.

5. The method of claim 1, further comprising:
   decoding, upon transitioning to the paging mode, paging signaling by blind detection according to a predetermined sequence of paging channel rates.

6. The method of claim 1, wherein the first and second set of network parameters include one or more of a system identification (SID), a network identification (NID), a band class, a frequency channel, or a pilot sequence.

7. The method of claim 6, wherein the determining comprises:
   determining that the first and second set of network parameters correspond based at least in part on the SID and the NID being the same in the first and second set of network parameters.

8. The method of claim 6, wherein the band class is one of a plurality of band classes listed in a channel list, and further wherein the determining comprises:
   determining that the first and second set of network parameters correspond based at least in part on the band class of the second set of network parameters being one of the plurality of band classes listed in the channel list.

9. The method of claim 6, wherein the frequency channel is one of a plurality of frequencies listed in a frequency channel list, and further wherein the determining comprises:
   determining that the first and second set of network parameters correspond based at least in part on the frequency channel of the second set of network parameters being one of the plurality of frequencies listed in the frequency channel list.

10. The method of claim 6, wherein the determining comprises:
    deteimining that the first and second set of network parameters correspond based at least in part on the SID, the NID, the band class, the frequency channel, and the pilot sequence being the same in the first and second set of network parameters.

11. The method of claim 1, wherein the mobile device is a user equipment unit operable to communicate on the wireless communications network.

12. A wireless communications system configured for direct transition from a traffic session to a paging mode, the system comprising:
    means for storing, before initiation of a traffic session with a wireless communications network, a first set of network parameters, wherein the first set of network parameters comprises a paging channel rate;
    means for storing, during the traffic session, a second set of network parameters,
    means for comparing the first set of network parameters to the second set of network parameters upon termination of the traffic session;
    means for determining, based on the comparing, that the first and second set of network parameters correspond to each other;
    means for transitioning, based on the determination, directly from the traffic session to the paging mode; and
    means for decoding, upon transitioning to the paging mode, paging signaling utilizing the paging channel rate.

13. The wireless communications system of claim 12, further comprising:
    means for receiving, by a first receiver of the mobile device, data signaling associated with the traffic session; and
    means for receiving, by a second receiver of the mobile device, paging signaling comprising one or more of pilot sequences or synchronization signaling.

14. The wireless communications system of claim 12, wherein the means for transitioning further comprises:
    means for transitioning from the traffic session to the paging mode without performing one or more of pilot acquisition or synchronization signal decoding.

15. The wireless communications system of claim 12, further comprising:
    means for receiving, before initiation of the traffic session, the first set of network parameters from the wireless communications network over a paging channel; and
    means for receiving, during the traffic session, the second set of network parameters from the wireless communications network over a traffic channel.

16. The wireless communications system of claim 12, further comprising:
    means for decoding, upon transitioning to the paging mode, paging signaling by blind detection according to a predetermined sequence of paging channel rates.

17. The wireless communications system of claim 12, wherein the first and second set of network parameters include one or more of a system identification (SID), a network identification (NID), a band class, a frequency channel, or a pilot sequence.

18. The wireless communications system of claim 17, wherein the means for determining comprises:
    means for determining that the first and second set of network parameters correspond based at least in part on the SID and the NID being the same in the first and second set of network parameters.

19. The wireless communications system of claim 17, wherein the band class is one of a plurality of band classes listed in a channel list, and further wherein the means for determining comprises:
  means for determining that the first and second set of network parameters correspond based at least in part on the band class of the second set of network parameters being one of the plurality of band classes listed in the channel list.

20. The wireless communications system of claim 17, wherein the frequency channel is one of a plurality of frequencies listed in a frequency channel list, and further wherein the means for determining comprises:
  means for determining that the first and second set of network parameters correspond based at least in part on the frequency channel of the second set of network parameters being one of the plurality of frequencies listed in the frequency channel list.

21. The wireless communications system of claim 17, wherein the means for determining comprises:
  means for determining that the first and second set of network parameters correspond based at least in part on the SID, the NID, the band class, the frequency channel, and the pilot sequence being the same in the first and second set of network parameters.

22. A non-transitory computer readable medium storing computer executable code for fast transition from a traffic session to a paging mode in a wireless communications system, comprising code to:
  store, before initiation of a traffic session with a wireless communications network, a first set of network parameters, wherein the first set of network parameters comprises a paging channel rate;
  store, during the traffic session, a second set of network parameters;
  compare the first set of network parameters to the second set of network parameters upon termination of the traffic session;
  determine, based on the comparing, that the first and second set of network parameters correspond to each other;
  transition, based on the determination, directly from the traffic session to the paging mode; and
  decode, upon transitioning to the paging mode, paging signaling utilizing the paging channel rate.

23. The non-transitory computer readable medium of claim 22, further comprising code to:
  receive, by a first receiver of the mobile device, data signaling associated with the traffic session; and
  receive, by a second receiver of the mobile device, paging signaling comprising one or more of pilot sequences or synchronization signaling.

24. The non-transitory computer readable medium of claim 22, wherein the non-transitory computer readable medium further comprises:
  code for transitioning from the traffic session to the paging mode without performing one or more of pilot acquisition or synchronization signal decoding.

25. The non-transitory computer readable medium of claim 22, wherein the non-transitory computer readable medium further comprises code to:
  receive, before initiation of the traffic session, the first set of network parameters from the wireless communications network over a paging channel; and
  receive, during the traffic session, the second set of network parameters from the wireless communications network over a traffic channel.

26. The non-transitory computer readable medium of claim 22, wherein the non-transitory computer readable medium further comprises code to:
  decode, upon transitioning to the paging mode, paging signaling by blind detection according to a predetermined sequence of paging channel rates.

27. The non-transitory computer readable medium of claim 22, wherein the first and second set of network parameters include one or more of a system identification (SID), a network identification (NID), a band class, a frequency channel, or a pilot sequence.

28. The non-transitory computer readable medium of claim 27, wherein the non-transitory computer readable medium further comprises code to:
  determine that the first and second set of network parameters correspond based at least in part on the SID and the NID being the same in the first and second set of network parameters.

29. The non-transitory computer readable medium of claim 27, wherein the band class is one of a plurality of band classes listed in a channel list, and wherein the non-transitory computer readable medium further comprises code to:
  determine that the first and second set of network parameters correspond based at least in part on the band class of the second set of network parameters being one of the plurality of band classes listed in the channel list.

30. The non-transitory computer readable medium of claim 27, wherein the frequency channel is one of a plurality of frequencies listed in a frequency channel list, and wherein the non-transitory computer readable medium further comprises code to:
  determine that the first and second set of network parameters correspond based at least in part on the frequency channel of the second set of network parameters being one of the plurality of frequencies listed in the frequency channel list.

31. The non-transitory computer readable medium of claim 27, wherein the non-transitory computer readable medium further comprises code to:
  determine that the first and second set of network parameters correspond based at least in part on the SID, the NID, the band class, the frequency channel, and the pilot sequence being the same in the first and second set of network parameters.

32. The non-transitory computer readable medium of claim 22, wherein the non-transitory computer readable medium is a user equipment operable on a wireless communications network.

33. A wireless communications device configured for fast transition from a traffic session to a paging mode, the wireless communications device comprising:
  at least one controller configured to,
    store, before initiation of a traffic session with a wireless communications network, a first set of network parameters, wherein the first set of network parameters comprises a paging channel rate;
    store, during the traffic session, a second set of network parameters;
    compare the first set of network parameters to the second set of network parameters upon termination of the traffic session;
    determine, based on the comparing, that the first and second set of network parameters correspond to each other;
    transition, based on the determined synchronization information, directly from the traffic session to the paging mode; and decoding, upon transitioning to the paging mode, paging signaling utilizing the paging channel rate.

34. The wireless communications device of claim 33, further comprising:
a first receiver configured to receive data signaling associated with the traffic session; and
a second receiver configured to receive paging signaling comprising one or more of pilot sequences or synchronization signaling.

35. The wireless communications device of claim 33, wherein the at least one controller is further configured to:
transition from the traffic session to the paging mode without performing one or more of pilot acquisition or synchronization signal decoding.

36. The wireless communications device of claim 33, wherein the at least one controller is further configured to:
receive, before initiation of the traffic session, the first set of network parameters from the wireless communications network over a paging channel; and
receive, during the traffic session, the second set of network parameters from the wireless communications network over a traffic channel.

37. The wireless communications device of claim 33, wherein the at least one controller is further configured to:
decode, upon transitioning to the paging mode, paging signaling by blind detection according to a predetermined sequence of paging channel rates.

38. The wireless communications device of claim 33, wherein the first and second set of network parameters include one or more of a system identification (SID), a network identification (NID), a band class, a frequency channel, or a pilot sequence.

39. The wireless communications device of claim 38, wherein the at least one controller is further configured to:
determine that the first and second set of network parameters correspond based at least in part on the SID and the NID being the same in the first and second set of network parameters.

40. The wireless communications device of claim 38, wherein the band class is one of a plurality of band classes listed in a channel list, and further wherein the at least one controller is further configured to:
determine that the first and second set of network parameters correspond based at least in part on the band class of the second set of network parameters being one of the plurality of band classes listed in the channel list.

41. The wireless communications device of claim 38, wherein the frequency channel is one of a plurality of frequencies listed in a frequency channel list, and further wherein the at least one controller is further configured to:
determine that the first and second set of network parameters correspond based at least in part on the frequency channel of the second set of network parameters being one of the plurality of frequencies listed in the frequency channel list.

42. The wireless communications device of claim 38, wherein the at least one controller configured is further configured to:
determine that the first and second set of network parameters correspond based at least in part on the SID, the NID, the band class, the frequency channel, and the pilot sequence being the same in the first and second set of network parameters.

43. The wireless communications device of claim 33, wherein the wireless communications device is a user equipment unit operable to communicate on the wireless communications system.

* * * * *